(12) United States Patent
Fu et al.

(10) Patent No.: US 12,311,454 B2
(45) Date of Patent: May 27, 2025

(54) ELECTRIC CIRCULAR SAW

(71) Applicant: Nanjing Chervon Industry Co., Ltd., Nanjing (CN)

(72) Inventors: Xiangqing Fu, Nanjing (CN); Junyong Yang, Nanjing (CN); Cong Li, Nanjing (CN); Liang Chen, Nanjing (CN); Junjie Ye, Nanjing (CN); Fangya Lv, Nanjing (CN); Shuming Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 591 days.

(21) Appl. No.: 17/317,994

(22) Filed: May 12, 2021

(65) Prior Publication Data
US 2021/0354219 A1 Nov. 18, 2021

(30) Foreign Application Priority Data
May 12, 2020 (CN) .......................... 202010398344.8

(51) Int. Cl.
*B23D 47/12* (2006.01)
*B23D 45/16* (2006.01)
*B25F 5/00* (2006.01)

(52) U.S. Cl.
CPC ............. *B23D 47/12* (2013.01); *B23D 45/16* (2013.01); *B25F 5/001* (2013.01)

(58) Field of Classification Search
CPC .... B23D 45/126; B23D 47/126; B27B 17/08; B27B 17/086; B27G 19/04; A61F 15/02
USPC .......................................... 74/424.5; 30/388
See application file for complete search history.

(56) References Cited

U.S. PATENT DOCUMENTS

| | | | | |
|---|---|---|---|---|
| 1,588,744 | A * | 6/1926 | Keane ................... | A22B 5/205 30/372 |
| 1,672,238 | A * | 6/1928 | Wallace ................ | B27G 19/04 83/564 |
| 1,701,948 | A * | 2/1929 | Crowe .................. | B27G 19/04 83/544 |
| 1,902,683 | A * | 3/1933 | Wildhaber ............. | F16H 55/22 74/458 |
| 2,072,750 | A * | 3/1937 | Hampton ................ | B27B 9/00 29/DIG. 60 |

(Continued)

FOREIGN PATENT DOCUMENTS

CN 113245621 A * 8/2021 ............. B23D 51/16

*Primary Examiner* — Ghassem Alie
*Assistant Examiner* — Samuel A Davies
(74) *Attorney, Agent, or Firm* — Greenberg Traurig, LLP

(57) ABSTRACT

An electric circular saw includes a housing, a motor including a motor shaft enabled to rotate about a first rotation axis, and a transmission assembly including a first transmission member and a second transmission member. The motor shaft has a first end and a second end oppositely arranged in a longitudinal direction and the first transmission member is mounted to the second end of the motor shaft. In a coordinate system having an origin defined by a point on a center line of the second transmission member, a positive direction of an X axis defined by a forward direction of the electric circular, and a positive direction of a Y axis defined by an upper side of the electric circular saw, the second end of the motor shaft is arranged in a first quadrant of the coordinate system.

20 Claims, 18 Drawing Sheets

(56) References Cited

U.S. PATENT DOCUMENTS

| | | | | |
|---|---|---|---|---|
| 2,228,664 | A * | 1/1941 | Knouse | B27B 9/00 74/400 |
| 2,346,961 | A * | 4/1944 | Gundelfinger | B27B 9/02 30/376 |
| 2,440,033 | A * | 4/1948 | West | B27B 9/00 30/390 |
| 2,544,461 | A * | 3/1951 | Leitzel | B23D 47/126 30/376 |
| 3,125,807 | A * | 3/1964 | Bayard | B26B 19/14 30/240 |
| 3,221,783 | A * | 12/1965 | Kaltenmark | B27G 19/04 30/376 |
| 3,262,331 | A * | 7/1966 | Breuer | F16H 55/0853 74/462 |
| 5,357,834 | A * | 10/1994 | Ito | B23D 47/126 83/486.1 |
| 5,850,698 | A * | 12/1998 | Hurn | B27B 9/00 30/377 |
| 6,128,969 | A * | 10/2000 | Litvin | F16H 1/125 74/462 |
| 6,665,943 | B1 * | 12/2003 | Sloane | A01G 3/0535 30/264 |
| 8,424,213 | B2 * | 4/2013 | Fukinuki | B27B 9/00 30/388 |
| 8,567,280 | B2 * | 10/2013 | Bogar | F16H 1/163 74/424.5 |
| 2002/0152867 | A1 * | 10/2002 | Meredith | B23D 45/048 83/522.11 |
| 2005/0097760 | A1 * | 5/2005 | McDonnell | B23D 47/123 30/388 |
| 2006/0005653 | A1 * | 1/2006 | Fleytman | F16H 1/06 74/425 |
| 2009/0223069 | A1 * | 9/2009 | Parks | B27B 9/00 30/391 |
| 2013/0081286 | A1 * | 4/2013 | Moreno | B27B 5/29 30/377 |
| 2015/0059548 | A1 * | 3/2015 | Kani | B23D 45/048 83/491 |
| 2016/0121513 | A1 * | 5/2016 | Mahoney | B23D 45/16 30/374 |
| 2017/0120436 | A1 * | 5/2017 | Rudolph | B23D 47/12 |
| 2018/0281086 | A1 * | 10/2018 | Greitmann | B25F 5/021 |
| 2022/0143774 | A1 * | 5/2022 | Zhang | B24B 41/04 |

\* cited by examiner

ELECTRIC CIRCULAR SAW

RELATED APPLICATION INFORMATION

This application claims the benefit under 35 U.S.C. § 119(a) of Chinese Patent Application No. CN 202010398344.8, filed on May 12, 2020, which is incorporated by reference in its entirety herein.

BACKGROUND

An electric circular saw is a tool that, powered by a single-phase series motor, drives a saw blade through a transmission mechanism to perform sawing operations. According to the type of power supply, electric circular saws are basically categorized into DC circular saws and AC circular saws. DC circular saws are popular among users because of safety, reliability, high work efficiency, and easy carrying.

However, for a DC circular saw on the current market, the motor is usually arranged on one side of the saw blade, making the center of gravity of the electric circular saw to be located on one side of the saw blade. Therefore, during operation of the electric circular saw, the user needs to apply a great force to prevent the electric circular saw from overturning, which causes the electric circular saw to be laborious and inconvenient to control.

SUMMARY

In one aspect of the disclosure, an electric circular saw includes: a housing; a motor including a motor shaft enabled to rotate about a first rotation axis, the motor at least partially disposed in the housing; a transmission assembly including a first transmission member connected with the motor for introducing power into the transmission assembly and a second transmission member for outputting power, the second transmission member enabled to rotate about a second rotation axis; wherein the motor shaft has a first end and a second end oppositely arranged in a longitudinal direction, and the first transmission member is mounted to the second end of the motor shaft; in a coordinate system with a point on a center line of the second transmission member as an origin, a forward direction of the electric circular saw as a positive direction of an X axis, and an upper side of the electric circular saw as a positive direction of a Y axis, the second end of the motor shaft is arranged in a first quadrant of the coordinate system.

In an example, the first transmission member is arranged in the first quadrant of the coordinate system.

In an example, the first end of the motor shaft is arranged in a second quadrant of the coordinate system.

In an example, the first end of the motor shaft is arranged on an upper side of the second end.

In an example, the electric circular saw has a cutting plane, and the cutting plane is an extended plane of a saw blade when the saw blade is mounted to the electric circular saw; a projection of a line connecting the first end of the motor shaft and the center of the second transmission member on the cutting plane is a first projection line, and an included angle b formed by an oblique intersection of the first projection line and the Y axis is greater than or equal to 0 degree and less than or equal to 30 degrees.

In an example, a projection of a line connecting the second end of the motor shaft and the center of the second transmission member on the cutting plane is a second projection line, and an included angle c formed by an oblique intersection of the second projection line and the Y axis is greater than or equal to 0 degree and less than or equal to 60 degrees.

In an example, a projection of a line connecting the second end of the motor shaft and the center of the second transmission member on the cutting plane is a second projection line, and an included angle d formed by an intersection of the second projection line and the first projection line is greater than or equal to 0 degree and less than or equal to 90 degrees.

In an example, the housing further includes: a main handle for a user to hold; a switch assembly mounted to the main handle; a motor casing portion enclosing the motor; and a battery mounting portion configured to detachably mount a battery pack; wherein the battery mounting portion is configured to connect the motor casing portion and the main handle.

In an example, the electric circular saw also includes a saw blade for cutting a workpiece; wherein a distance between the first end of the motor shaft and the saw blade is less than a sum of a distance between the second end of the motor shaft and the saw blade and a length of the motor shaft.

In an example, a ratio of the distance between the first end of the motor shaft and the saw blade to the sum of the distance between the second end of the motor shaft and the saw blade and the length of the motor shaft is greater than or equal to 0.8.

In an example, the distance between the first end of the motor shaft and the saw blade is greater than or equal to 105 mm and less than or equal to 160 mm.

In an example, the electric circular saw further includes: a battery pack mounted to the housing for supplying electric energy to the motor; wherein the first transmission member is enabled to rotate synchronously with the motor, the second transmission member is enabled to be driven by the first transmission member to rotate about the second rotation axis, and the second rotation axis substantially extends along a left-right direction; the first rotation axis intersects the left-right direction; in an up-down direction, the second end is located on a lower side of the first end, and the up-down direction is substantially perpendicular to the left-right direction.

In an example, the electric circular saw further includes: a cutting attachment enabled to be driven by the motor to rotate about the second rotation axis; the cutting attachment has a first side surface, and the first side surface is parallel to the cutting plane; the motor has a first end surface, in the left-right direction, the first end surface is located on a side away from the cutting attachment; a distance between the first end surface and the first side surface along a first direction parallel to the first rotation axis is a first length L1; a distance between the first end surface and the first side surface along a second direction parallel to the second rotation axis is a second length L2; wherein a ratio of the first length L1 to the second length L2 ranges from 1.02 to 1.1.

In an example, the first transmission member is fixedly connected or integrally formed with the motor shaft; the first transmission member engages with the second transmission member.

In an example, a ratio of a rotational speed of the first transmission member driven by the motor to a rotational speed of the second transmission member driven by the first transmission member is a reduction ratio, and the reduction ratio is greater than or equal to 4 and less than or equal to 6.5.

In an example, the electric circular saw includes at least two battery packs.

In an example, the housing includes a main handle, a motor casing portion for accommodating the motor, and a battery mounting portion provided between the main handle and the motor casing portion, the battery mounting portion comprises a first mounting portion for guiding a first battery pack to be coupled to the housing in a first linear direction and a second mounting portion for guiding a second battery pack to be coupled to the housing in a second linear direction, and the second mounting portion is provided at a lower side of the first mounting portion.

In an example, the first linear direction is parallel to the second linear direction.

In an example, the first linear direction obliquely intersects the first rotation axis.

In an example, the main handle is basically symmetrically arranged about a plane and the first linear direction obliquely intersects the plane.

In another aspect of the disclosure, an electric circular saw includes a housing; a motor comprising a motor shaft enabled to rotate about a first rotation axis, the motor at least partially disposed in the housing; a transmission assembly comprising a first transmission member connected with the motor for introducing power into the transmission assembly and a second transmission member for outputting power, the second transmission member enabled to rotate about a second rotation axis. The motor shaft has a first end and a second end oppositely arranged in a longitudinal direction, and the first transmission member is mounted to the second end of the motor shaft. In a coordinate system with a point on a center line of the second transmission member as an origin, a forward direction of the electric circular saw as a positive direction of an X axis, and an upper side of the electric circular saw as a positive direction of a Y axis, the first rotation axis obliquely intersects with the positive direction of the positive direction of the Y axis to form an angle a, and the angle a is greater than 0 degrees and less than 90 degrees.

In an example, the second end of the motor shaft is arranged in a first quadrant of the coordinate system.

DETAILED DESCRIPTION

Figure 1:
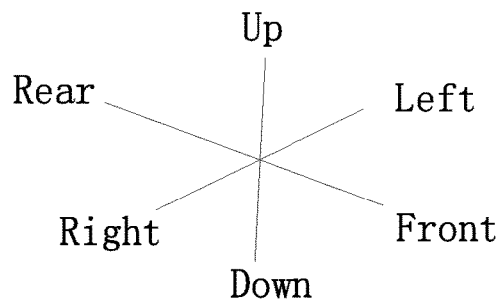
FIG. 1 is a perspective view of an example electric circular saw.
Figure 1:
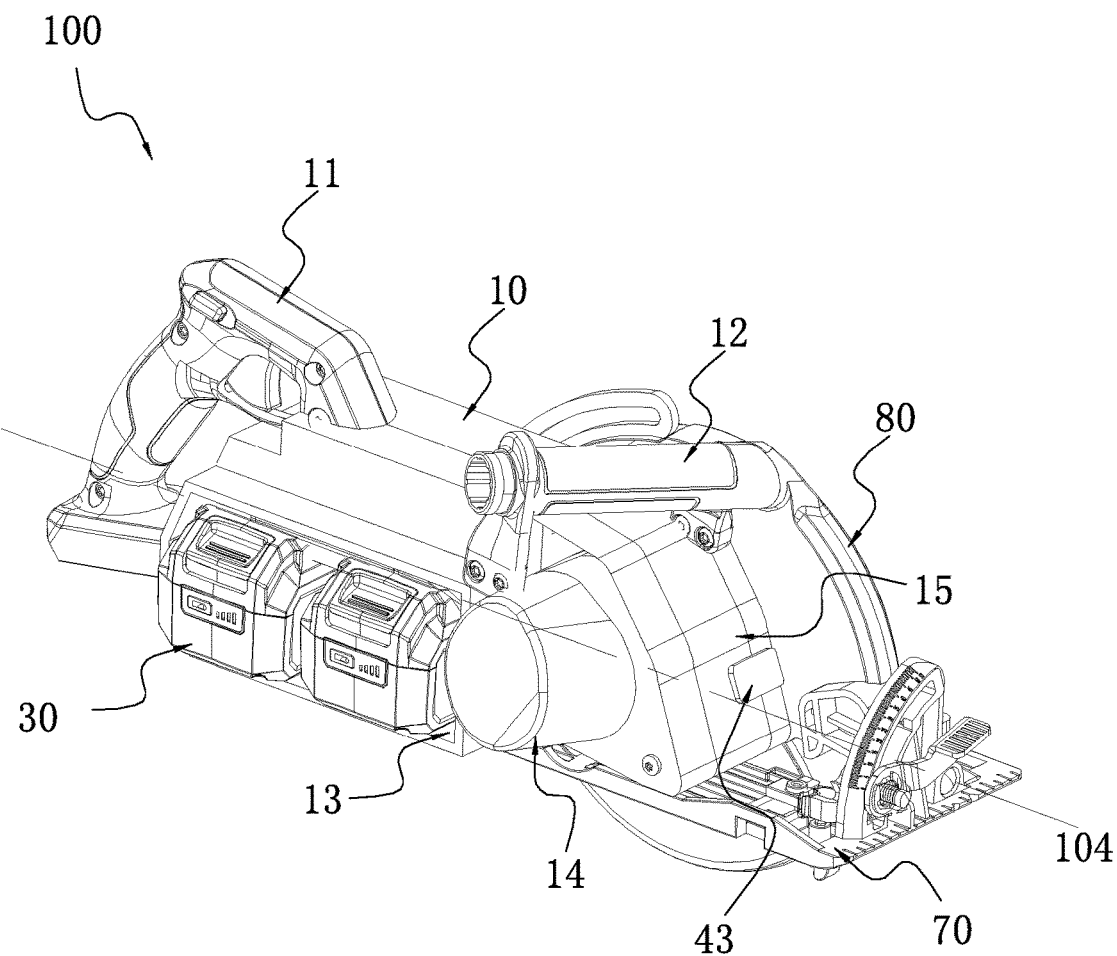
Figure 2:
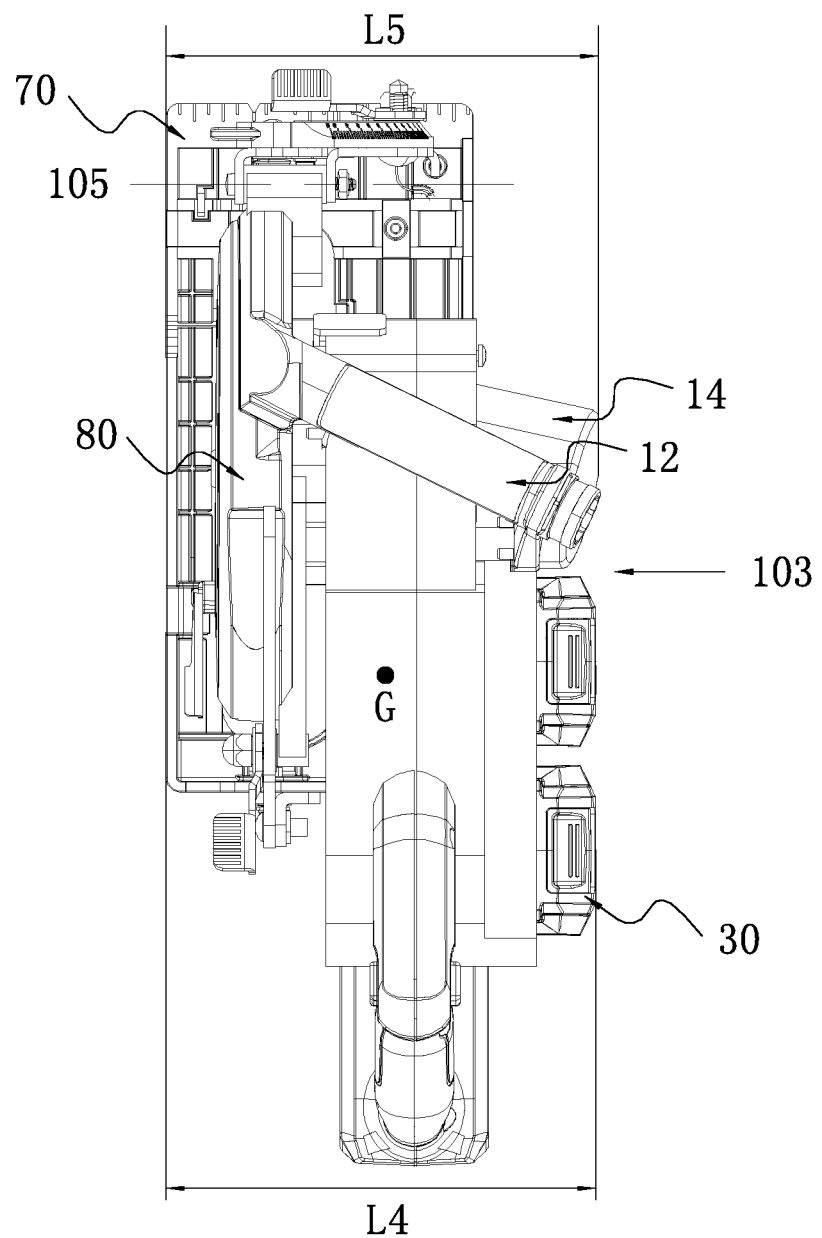
FIG. 2 is a top view of the electric circular saw shown in FIG. 1.

In order to clearly illustrate the technical solution of the present application, up, down, front, rear, left, and right directions are defined as shown in FIG. 1.

FIGS. 1-4 shows a circular saw 100 according to a first example, specifically, a hand-held circular saw, including: a housing 10, a motor 20, a battery pack 30, a transmission assembly 40, a cutting attachment 50, an output shaft 60 and a base plate 70, wherein the housing 10 forms an accommodating cavity. The motor 20 has a motor shaft 21 enabled to rotate about a first rotation axis 101. The motor 20 is configured to drive the output shaft 60 to rotate about a second rotation axis 102. The motor 20 is at least partially disposed in the accommodating cavity. The battery pack 30 is mounted to the electric circular saw 100 to provide electric energy for the motor 20. The transmission assembly 40 is configured to transmit power output by the motor 20 to the output shaft 60, and the transmission assembly 40 includes a first transmission member 41 and a second transmission member 42. The first transmission member 41 is enabled to form a synchronous rotation with the motor shaft 21. The first transmission member 41 is used to introduce power from the motor 20, and the second transmission member 42 is used to output power. Specifically, the second transmission member 42 can be driven by the first transmission member 41 to rotate about the second rotation axis 102. The cutting attachment 50 is for cutting a workpiece, specifically, the cutting attachment 50 may be a saw blade 51. The base plate 70 is formed with a base plate plane 71 for contact with the workpiece. In the present application, the second rotation axis 102 extends substantially in the left-right direction.

In this example, the motor shaft 21 has a first end 22 and a second end 23 along its longitudinal direction. The second end 23 is used to output power to the transmission assembly 40, that is, the second end 23 is the output end of the motor shaft 21. The first transmission member 41 is mounted to the second end 23 of the motor shaft 21, specifically, the first transmission member 41 is fixedly mounted to the second end 23, or the first transmission member and the second end 23 are integrally formed. In the left-right direction, the first end 22 is configured to be farther away from the cutting attachment 50 than the second end 23. In the up-down direction, the second end 23 is located on the lower side of the first end 22. Thus, the distance L2 between the first end 22 of the motor shaft 21 and the saw blade 51 in the direction along the second rotation axis 102 is less than the sum of the distance L3 between the second end 23 and the saw blade 51 in the direction along the first rotation axis 101 and the length L of the motor shaft, that is L2<L3+L. In this way, the dimension of the circular saw 100 in the left-right direction is relatively small, and the whole structure is compact, thereby enabling the circular saw 100 to work in narrow space, which facilitates user's operation, transportation and storage. In this way, the center of gravity G of the circular saw 100 is closer to the blade 51, the distance D between the center of gravity G and the blade 51 is reduced. If the distance D between the center of gravity G and the blade 51 is large, in other words, the overturning moment of the electric circular saw 100 is large, the electric circular saw 100 may overturn easily when the user is cutting some narrow workpiece and the grip strength is relatively small. In order to avoid the circular saw 100 from overturning, the user needs to hold the electric circular saw 100 with greater strength to make the electric circular saw 100 run stably. With the above arrangement, the center of gravity G is close to the saw blade 51, and the overturning moment of the electric circular saw 100 is reduced, thereby facilitating the user's operation.

In the present example, the ratio of the distance L2 between the first end 22 of the motor shaft 21 and the saw blade 51 to the sum of the distance L3 between the second end 23 and the saw blade 51 and the length L of the motor shaft is greater than or equal to 0.8, that is L2/L3+L≥0.8. in this way, the dimension of the electric circular saw 100 in the left-right direction is more reasonable, and there is some space between the motor 20 and the saw blade 51 for accommodating the transmission assembly 40. The transmission assembly 40 is configured as a gear assembly with a small space occupation to realize power transmission, so that the structural layout of the whole machine is more reasonable. Furthermore, the size of the electric circular saw 100 in the front-rear direction is not increased when the size of the electric circular saw 100 in the left-right direction is reduced, that is, the length and width of the electric circular saw 100 are taken into account at the same time, so that the entire machine is relatively compact. Further, L2 is greater than or equal to 105 mm and less than or equal to 160 mm.

Further, the direction of the first rotation axis 101 and the direction of the second rotation axis 102 obliquely intersect. The included angle formed by the intersection of the direction of the first rotation axis 101 and the direction of the second rotation axis 102 is an acute angle, and the included angle formed by the intersection of the direction of the first rotation axis 101 and the direction of the second rotation axis 102 is greater than or equal to 10 degrees and less than or equal to 45 degrees. Further, the included angle formed by the intersection of the direction of the first rotation axis 101 and the direction of the second rotation axis 102 is greater than or equal to 10 degrees and less than or equal to 35 degrees. Further, the included angle formed by the intersection of the direction of the first rotation axis 101 and the direction of the second rotation axis 102 is greater than or equal to 10 degrees and less than or equal to 30 degrees. Further, the included angle formed by the intersection of the direction of the first rotation axis 101 and the direction of the second rotation axis 102 is greater than or equal to 10 degrees and less than or equal to 20 degrees. Further, the included angle formed by the intersection of the direction of the first rotation axis 101 and the direction of the second rotation axis 102 is greater than or equal to 12 degrees and less than 30 degrees. Further, the included angle formed by the intersection of the direction of the first rotation axis 101 and the direction of the second rotation axis 102 is greater than or equal to 12 degrees and less than 25 degrees. Further, the included angle formed by the intersection of the direction of the first rotation axis 101 and the direction of the second rotation axis 102 is greater than or equal to 12 degrees and less than or equal to 20 degrees. Further, the included angle formed by the intersection of the direction of the first rotation axis 101 and the direction of the second rotation axis 102 is greater than or equal to 12 degrees and less than or equal to 18 degrees. Further, the included angle formed by the intersection of the direction of the first rotation axis 101 and the direction of the second rotation axis 102 is greater than or equal to 15 degrees and less than or equal to 25 degrees. Therefore, by setting the included angle formed by the intersection of the direction of the first rotation axis 101 and the direction of the second rotation axis 102 to be within a certain range, the size of the electric circular saw 100 in the left-right direction can be reduced, while the size of the electric circular saw 100 in the front-rear direction is not increased or insignificantly increased.

The electric circular saw 100 further includes a guard 80, and the cutting attachment 50 can be driven by the motor 20 to rotate about a second rotation axis. Wherein, the second rotation axis is parallel to or coincides with the second rotation axis 102. The guard 80 partially encloses the cutting attachment 50 in the circumferential direction of the second rotation axis to protect the user from injury. The guard 80 is mounted to the electric circular saw 100. The guard 80 includes a fixed guard and a movable guard, the fixed guard is fixed relative to the housing 10, and the movable guard can rotate relative to the fixed guard. The base plate 70 is configured to support the electric circular saw 100. The fixed guard is arranged on the upper side of the base plate 70 and is connected to the housing 10. The base plate 70 is also formed with an opening for the saw blade 51 to at least partially pass through, so that the saw blade 51 can extend to the lower side of the floor plane 71. The base plate 70 has an angle plate 72 disposed on the front side of the base plate 70. The user can operate the angle plate 72 to enable the base plate 70 to rotate about a first rotating shaft 104 so as to adjust the cutting angle of the electric circular saw 100. The base plate 70 also has a depth adjusting plate, which is arranged on the rear side of the base plate 70. The user can operate the depth adjusting plate to enable the base plate 70 to rotate about a second rotating shaft 105 relative to the housing 10 so as to adjust the cutting depth of the electric circular saw 100. When the base plate 70 rotates about the second rotating shaft 105, the base plate 70 has an initial position with the maximum cutting depth with respect to the housing 10. At this time, the size of the part of the saw blade 51 that extends out of the base plate 70 is the largest, and the saw blade 51 is perpendicular to the base plate plane 71. In this example, the second rotation axis 102 coincides with the second rotation axis.

The transmission assembly 40 is arranged in the gear box, and the gear box is fixedly connected with the guard 80. The first transmission member 41 is enabled to rotate in a direction parallel to or coincident with the direction of the first rotation axis 101. The first transmission member 41 is fixedly connected or integrally formed with the motor shaft 21. In an example, it can be understood that the first transmission member 41 and the motor shaft 21 may be directly fixed or indirectly fixed, that is, the first transmission member 41 and the motor shaft 21 may be directly fixed by interference fit or the like, alternatively, the first transmission member 41 and the motor shaft 21 may be indirectly fixed through an intermediate connecting member. In this example, the first transmission member 41 and the motor shaft 21 are integrally formed, that is, the first transmission member 41 is a part of the motor shaft 21. In summary, in this application, the specific connection means between the first transmission member 41 and the motor shaft 21 is not limited, as long as the first transmission member 41 and the motor shaft 21 can be relatively fixed and form a synchronous rotation. The second transmission member 42 is enabled to be driven by the first transmission member 41 to rotate about the second rotation axis 102 to drive the saw blade 51 to rotate to realize the cutting function. Specifically, the first transmission member 41 is a helical gear, which forms an interference fit with the motor shaft 21. The second transmission member 42 is a helical gear, which is fixedly connected with the output shaft 60. The helical gears are directly engaged, that is, the helical gear of the motor shaft 21 drives the helical gear of the output shaft 60 to rotate. The ratio of the rotational speed of the helical gear driven by the motor 20 to the rotational speed of the helical gear fixedly connected to the output shaft 60 is a reduction ratio. In this example, the reduction ratio of the transmission assembly 40 is greater than or equal to 4 and less than or equal to 6.5. Of course, a bevel gear assembly of a smaller volume may also be used for transmission; specifically, both a first transmission member and a second transmission member are bevel gears.

It should be noted that, unless otherwise specified, a fixed connection mentioned in this application can be understood as either direct fixation or indirect fixation, as described above.

Figure 5:
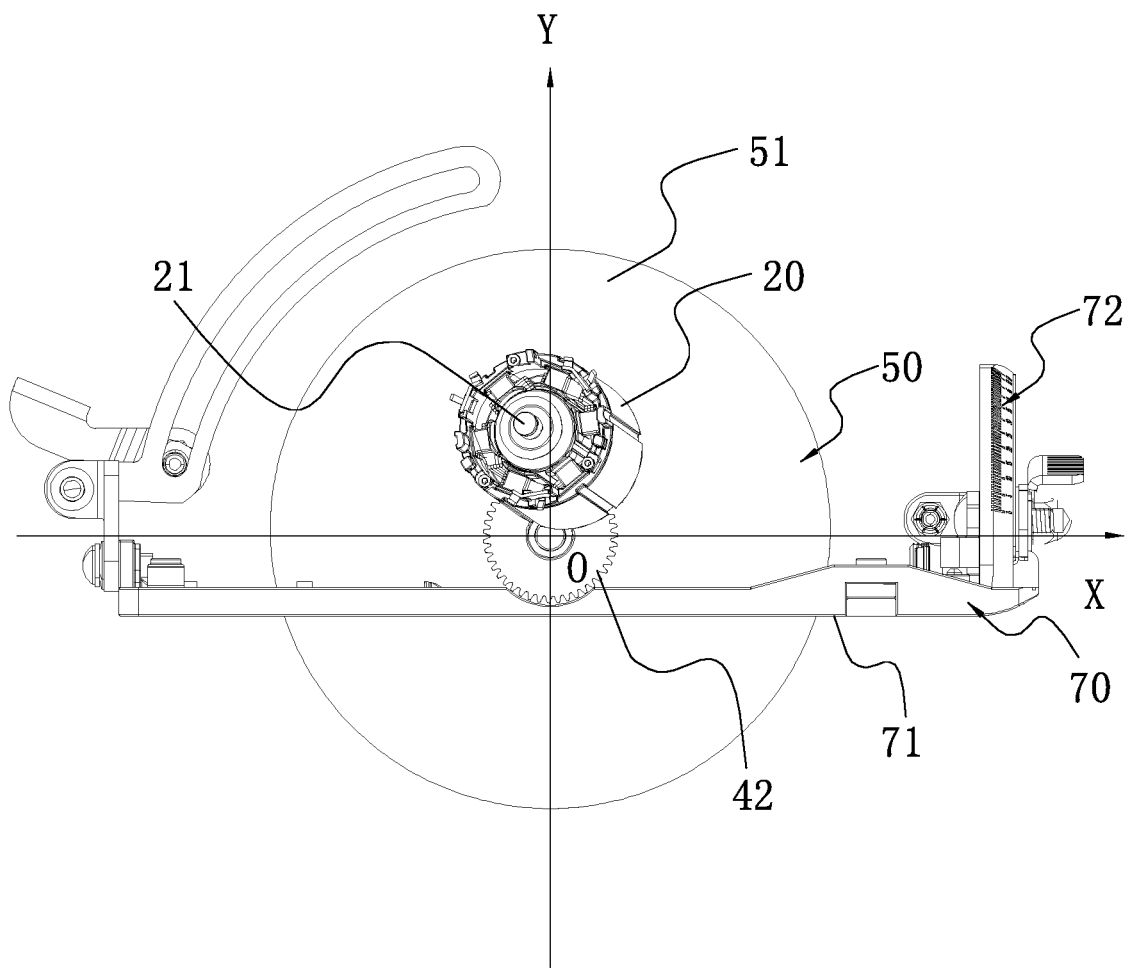
FIG. 5 is a front view of a part of the structure of the electric circular saw shown in FIG.
Figure 6:
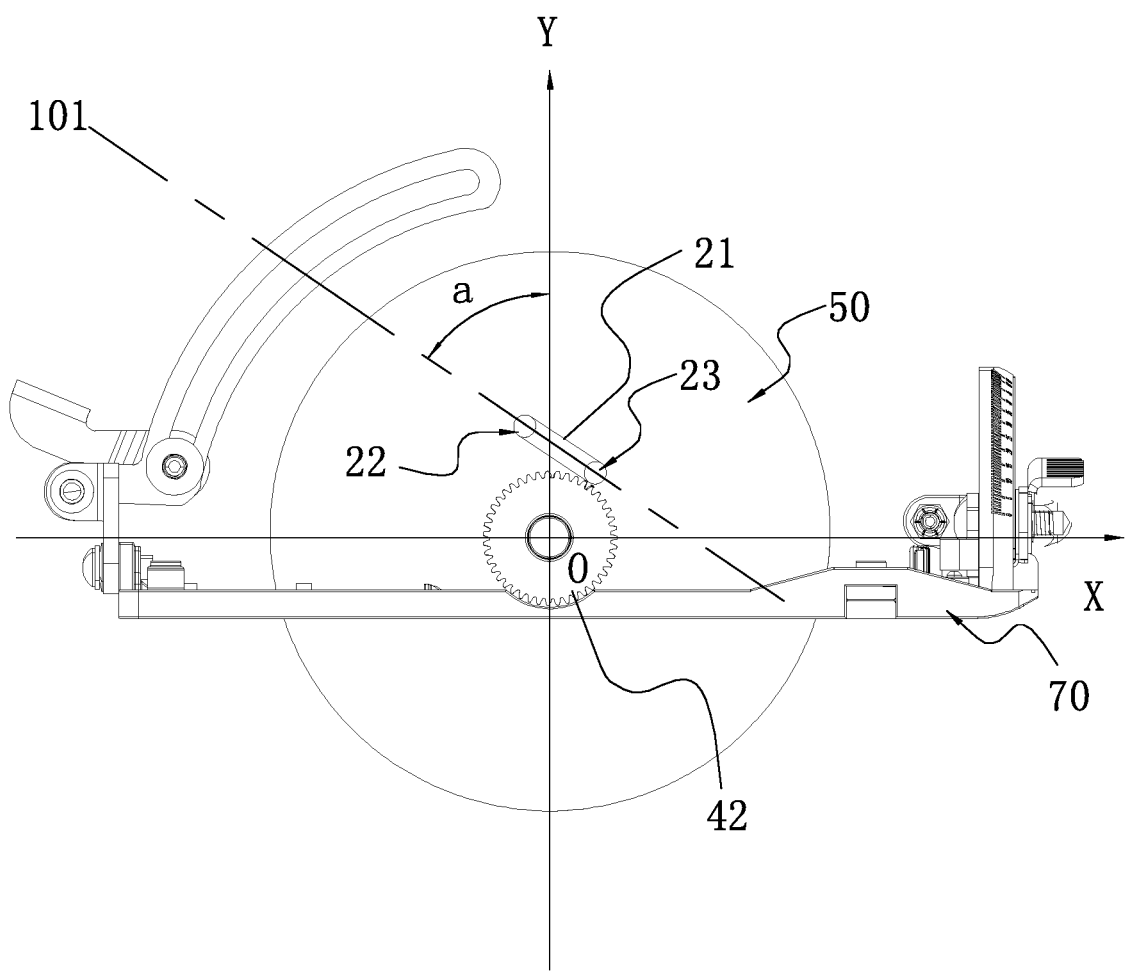
FIG. 6 is a front view of a part of the structure of the electric circular saw shown in FIG. 1.
Figure 12:
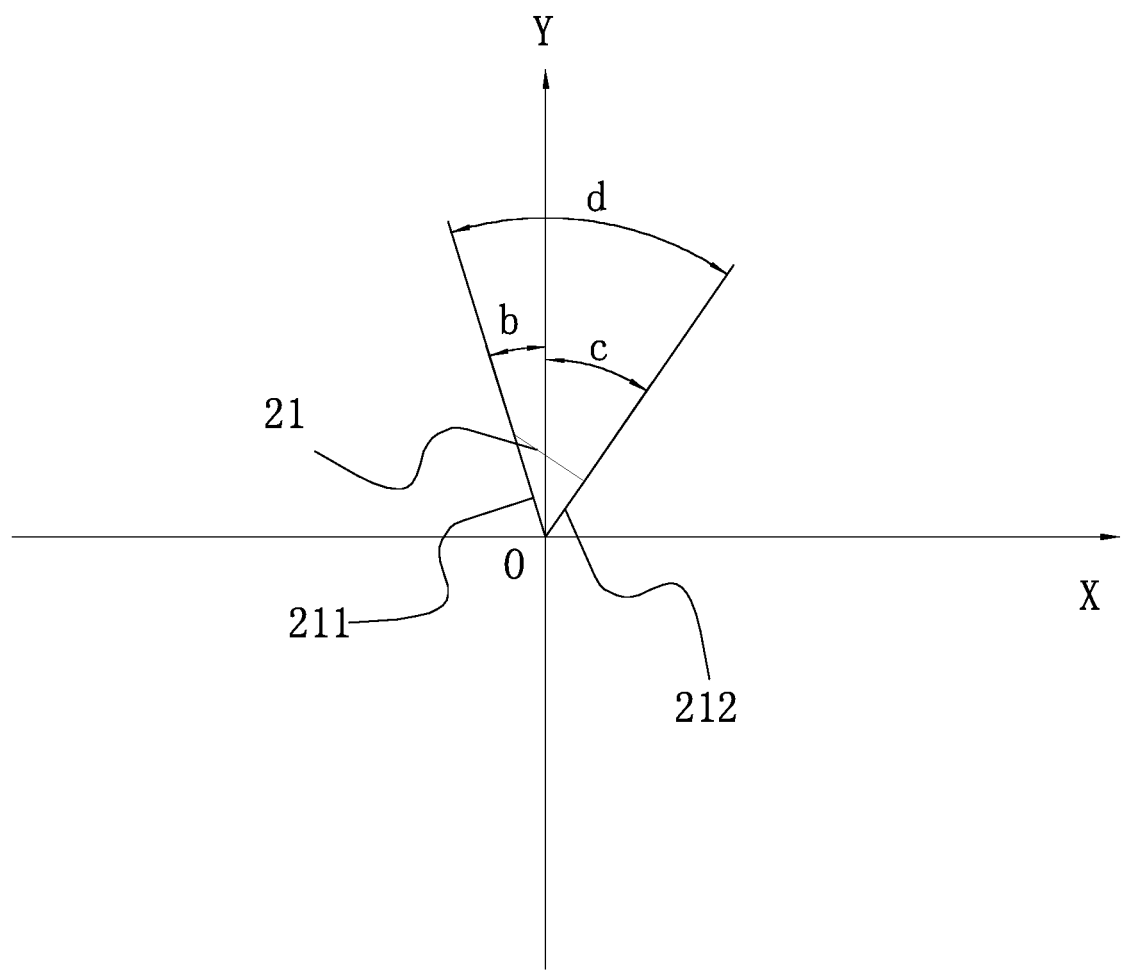
FIG. 12 is a simplified schematic diagram of FIG. 6.

For the convenience of description, as shown in FIG. 5, FIG. 6, and FIG. 12, a coordinate system with a point on the center line of the second transmission member as the origin O is established, wherein the front-rear direction is the direction of the X-axis, and the direction pointing to the front side is the positive direction of the X-axis; the up-down direction is the direction of the Y-axis, and the direction pointing to the upper side is the positive direction of the Y-axis. The center line is the second rotation axis 102. In the present example, the first rotation axis obliquely intersects with the positive direction of the positive direction of the Y axis to form an angle a, and the angle a is greater than 0 degrees and less than 90 degrees. The second end 23 of the motor shaft 21 is disposed in the first quadrant of the coordinate system, such that the first transmission member 41 is disposed in the first quadrant, in the front-rear direction, the first transmission member 41 is arranged on the front side of the second rotation axis 102, in the up-down direction, the first transmission member 41 is arranged on the upper side of the second rotation axis 102. The second end 23 of the motor shaft 21 is disposed on the front side of the second rotation axis 102, and the first transmission member 41 is disposed on the front side of the second rotation axis 102, which can make full use of the space on the front side of the second rotation axis 102. This not only saves the space in the rear half of the electric circular saw 100, but also avoids the length of the electric circular saw 100 in the front-rear direction to be too long when the first transmission member 41 is arranged in the second quadrant or the third quadrant. The second end 23 of the motor shaft 21 is disposed on the upper side of the second rotation axis 102 to make use of the space on the upper side the second rotation axis 102, and to avoid or reduce the use of space on the lower side of the second rotation axis 102, thereby reducing the distance from the second rotation axis 102 to the base plate 70, in other words, reducing the distance from the center of the saw blade 51 to the base plate 70, thus ensuring or increasing the maximum cutting depth of the circular saw 100, and avoiding increasing the distance from the center of the saw blade 51 to the base plate 70 when the second end 23 of the motor shaft 21 is arranged in the third quadrant or the fourth quadrant. In fact, in this example, the second end 23 of the motor shaft 21 is arranged on the upper side of the second rotation axis 102, so that there is enough space on the lower side of the motor 20 to allow a motor shell to wrap the motor 20 and also the housing 10 to wrap the motor 20 and the motor shell even when the distance between the second rotation axis 102 of the first transmission member 41 and the base plate 70 remains unchanged. Specifically, the housing 10 includes a motor casing portion 14 and a transmission casing portion 15. The transmission assembly 40 is arranged in the gear box, the gear box is fixedly connected with the guard 80, and the transmission casing portion 15 wraps the gear box. The motor 20 is arranged in the motor shell, and the motor casing portion 14 then wraps the motor shell. Wherein, the motor shell and the gear box are both made of metal materials, and the motor casing portion 14 and the transmission casing portion 15 are both made of plastic materials. Thus, since the second end 23 of the motor shaft 21 is arranged in the first quadrant of the coordinate system, the motor casing portion 14 and the transmission casing portion 15 only occupy a small space on the lower side of the second rotation axis 102, thereby increasing the maximum cutting depth of the electric circular saw 100. Of course, from a cost perspective, the motor shell may also be made of plastic.

The blade 51 is mounted to the output shaft 60 and forms a synchronous rotation with the output shaft. The circular saw 100 has a cutting plane P, wherein the cutting plane P is the extended plane of the saw blade when the saw blade 51 is mounted to the electric circular saw 100. The first end 22 of the motor shaft 21 is displaced in the second quadrant, and the projection of a line connecting the first end 22 of the motor shaft 21 and the center of the second transmission member 42 on the cutting plane P is a first projection line 211. The included angle b formed by the oblique intersection of the first projection line 211 and the positive direction of the Y-axis is greater than or equal to 0 degree and less than or equal to 30 degrees. The rotor and the stator of the motor 20 are arranged closer to the first end 22 than to the second end 23, that is, in the up-down direction, the length of the motor 20 close to the first end 22 is the largest. This arrangement can make the first end 22 of the motor 20 substantially located on the upper side of the second rotation axis 102, that is, the entire motor 20 can be substantially located on the upper side of the second rotation axis 102 without taking up the position of the second rotation axis 102 to ensure the cutting depth of the electric circular saw 100. The projection of a line connecting the second end 23 of the motor shaft 21 and the center of the second transmission member 42 on the cutting plane P is a second projection line 212. The second end 23 of the motor shaft 21 is located in the first quadrant. The included angle c formed by the oblique intersection of the second projection line 212 and the Y-axis is greater than or equal to 0 degree and less than or equal to 60 degrees. That is, the second end 23 of the motor shaft 21 is located on the upper side of the second rotation axis 102. By arranging the second end 23 of the motor shaft 21 within the above range, the second end 23 of the motor shaft 21 is substantially located in the upper space of the second rotation axis 102, If the position of the second end 23 is arranged on the lower side of the second rotation axis 102, the transmission casing portion 15 and the motor casing portion 14 would take up more space on the lower side of the second rotation axis 102, thereby causing the base plate 70 to be placed too low, which affects the maximum cutting depth of the electric circular saw 100. Further, the included angle d formed by the intersection of the first projection line 211 and the second projection line 212 is greater than or equal to 0 degree and less than or equal to 90 degrees, and the above arrangement makes the motor 20 substantially located on the upper side of the second rotation axis 102, so that there is enough space on the lower side of the second rotation axis 102 to arrange the motor shell and motor casing portion 14, etc. If the motor shell and motor casing portion 14 take up too much space on the lower side of the second rotation axis 102, the base plate 70 has to be set lower, which affects the cutting depth of the electric circular saw 100.

Figure 4:
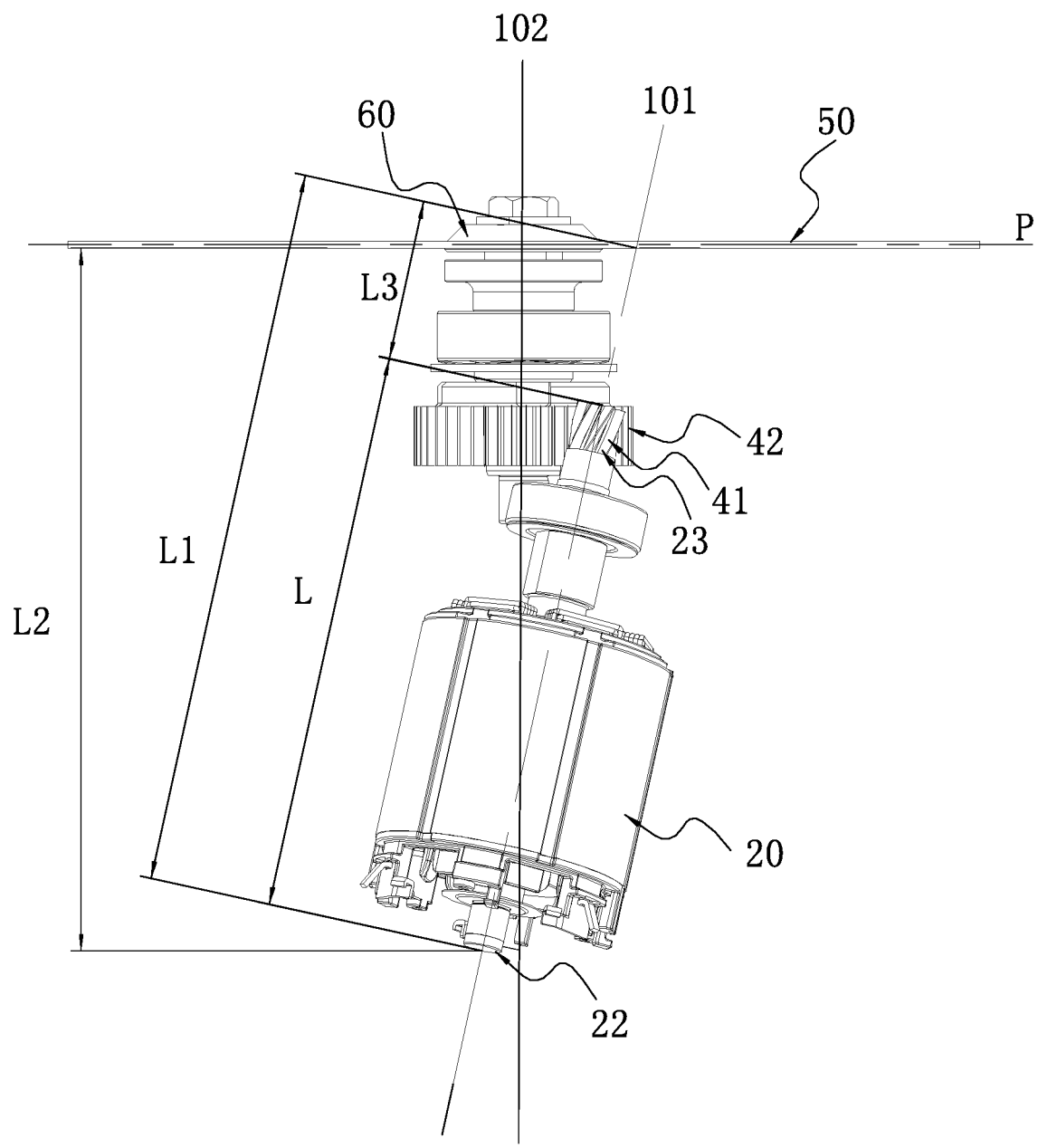
FIG. 4 is a top view of a part of the structure of the electric circular saw shown in FIG. 1.
Figure 7:
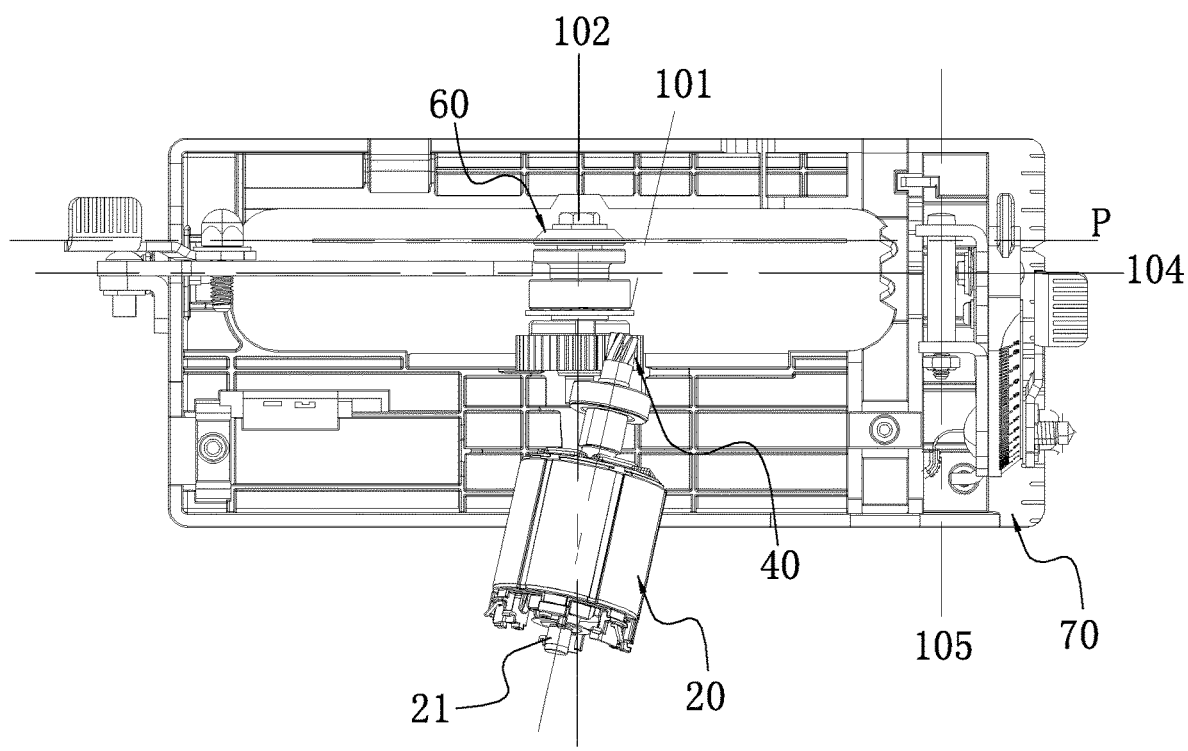
FIG. 7 is a top view of a part of the structure of the electric circular saw shown in FIG. 1.
Figure 8:
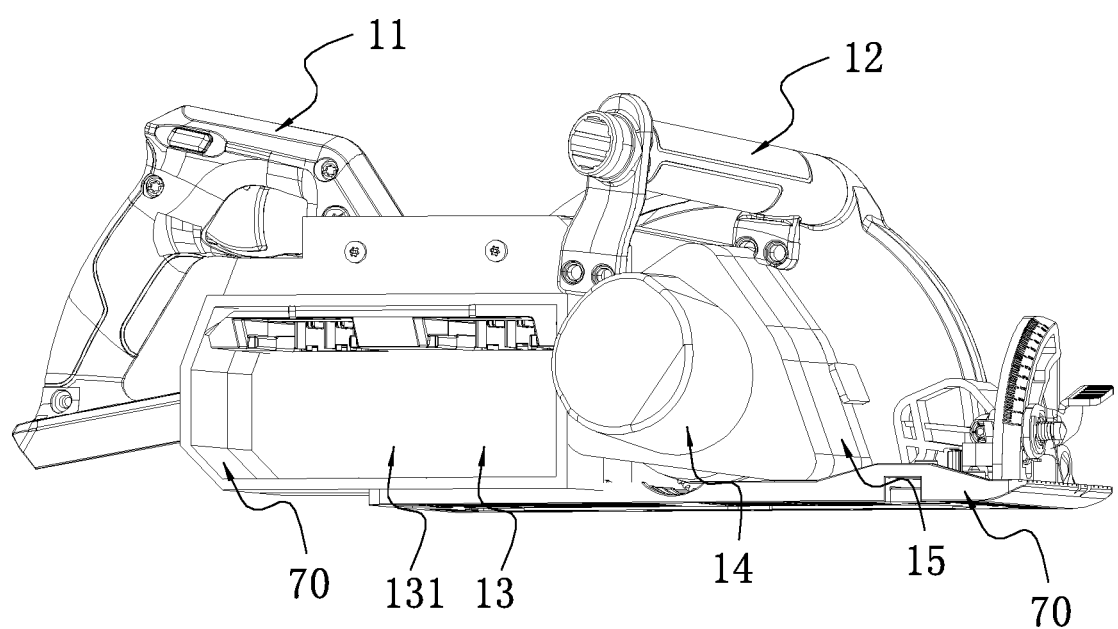
FIG. 8 is a top view of a part of the structure of the electric circular saw shown in FIG. 1.

As shown in FIGS. 4, 7, and 8, the cutting plane P and the second rotation axis 102 are perpendicular to each other, and the cutting plane P and the first rotation axis 101 intersect obliquely. The cutting plane P of the electric circular saw 100 obliquely intersects the first rotation axis 101 of the motor shaft 21, wherein the angle formed by the oblique intersection of the cutting plane P and the first rotation axis 101 is greater than or equal to 100 degrees and less than or equal to 145 degrees. Further, the angle formed by the oblique intersection of the cutting plane P and the first rotation axis 101 is greater than or equal to 100 degrees and less than or equal to 125 degrees. Further, the angle formed by the oblique intersection of the cutting plane P and the first rotation axis 101 is greater than or equal to 100 degrees and less than or equal to 120 degrees. Further, the angle formed by the oblique intersection of the cutting plane P and the first rotation axis 101 is greater than or equal to 100 degrees and less than or equal to 110 degrees. Further, the angle formed by the oblique intersection of the cutting plane P and the first rotation axis 101 is greater than or equal to 102 degrees and less than or equal to 120 degrees. Further, the angle formed by the oblique intersection of the cutting plane P and the first rotation axis 101 is greater than or equal to 102 degrees and less than or equal to 115 degrees. Further, the angle formed by the oblique intersection of the cutting plane P and the first rotation axis 101 is greater than or equal to 102 degrees and less than or equal to 110 degrees. Further, the angle formed by the oblique intersection of the cutting plane P and the first rotation axis 101 is greater than or equal to 102 degrees and less than or equal to 108 degrees. In this example, in the direction along the first rotation axis 101, the distance between the first end 22 of the motor shaft 21 and the saw blade 51 is L1. In the direction along the second rotation axis 102, the distance between the first end 22 of the motor shaft 21 and the saw blade 51 is L2, wherein the ratio of L1 to L2 is greater than or equal to 1.02 and less than or equal to 1.2. Further, the ratio of L1 to L2 is greater than or equal to 1.02 and less than or equal to 1.1.

Figure 3:
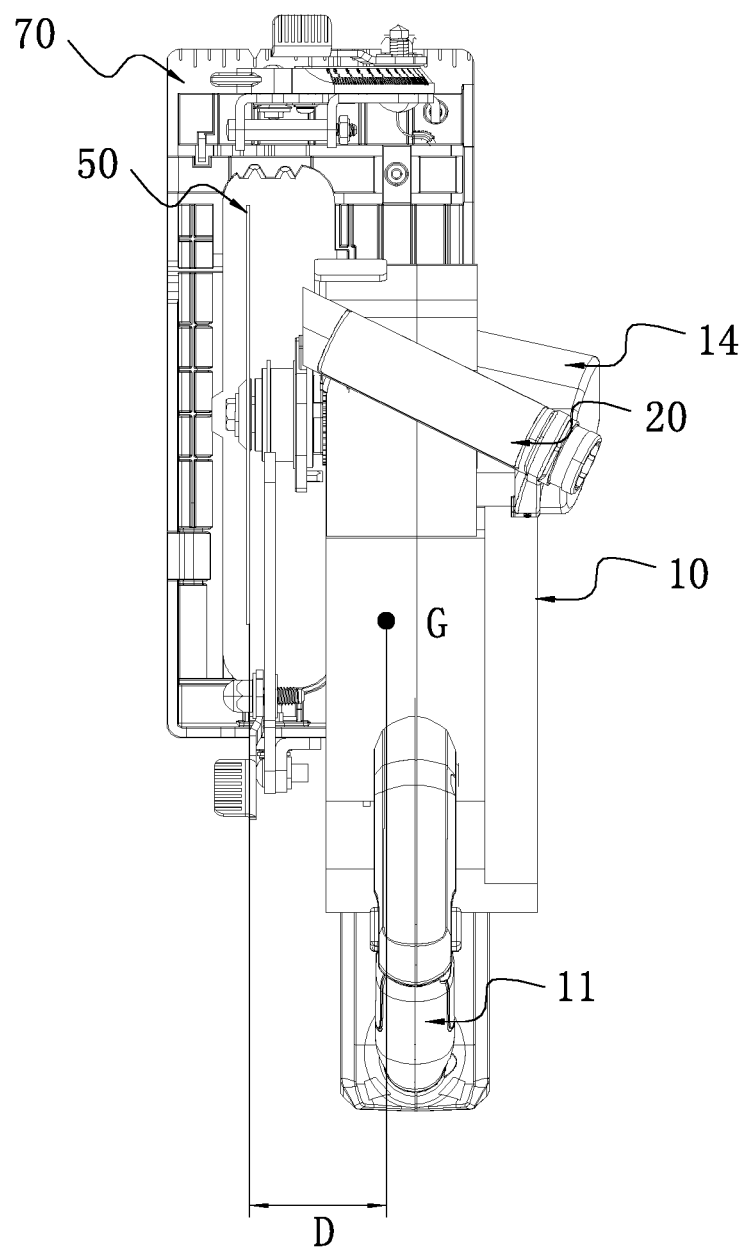
FIG. 3 is a top view of a part of the structure of the electric circular saw shown in FIG. 1.

The circular saw 100 further includes a shaft lock assembly 43. The shaft lock assembly 43 is used to lock the rotation of the second transmission member 42. When the second transmission member 42 is locked, the user can easily remove or install the saw blade 51. The shaft lock assembly 43 is arranged close to the helical gear. In order to facilitate user operation, the shaft lock assembly 43 is at least partially located outside the housing 10 for user operation. As shown in FIGS. 3 and 4, the first end 22 of the motor 20 is at least partially arranged in the second quadrant of the coordinate system, that is, in the front-rear direction, the first end 22 of the motor 20 is arranged behind the second end 23, in other words, in the front-rear direction, the distance from the first end 22 of the motor 20 to the angle plate 72 is greater than the distance from the second end 23 of the motor 20 to the angle plate 72. The shaft lock assembly 43 is arranged in the first quadrant and is located on the front side of the motor 20. With the above arrangement, the motor 20 is tilted backward to allow for enough space on the front side of the motor 20 for the user's hand to reach near the shaft lock assembly 34 to operate the shaft lock assembly 43; also, the distance between the angle plate 72 and the housing 10 is increased, so that the user can observe the cutting condition of the saw blade 51 from the right side of the electric circular saw. In the up-down direction, the first end 22 of the motor shaft 21 is also arranged on the upper side of the second end 23, which further allows the housing 10 to accommodate the motor 20 while not reducing the maximum cutting depth of the electric circular saw 100.

The circular saw 100 also includes a main handle 11 and the auxiliary handle 12. The main handle 11 and the auxiliary handle 12 are both used for the user to grip. The main handle 11 is fixedly connected or integrally formed with the housing 10. In the present example, the housing 10 is formed with the main handle 11, that is, the main handle 11 and the housing 10 are integrally formed, wherein the main handle 11 is provided with a switch assembly for prohibiting and allowing the battery pack 30 to provide energy to the motor 20. The housing 10 is connected to or formed with a battery mounting portion 13 for mounting the battery pack 30. In this example, the battery mounting portion 13 is formed by the housing 10 itself, that is, the battery mounting portion 13 and the housing 10 are integrally formed. In the front-rear direction, the battery mounting portion 13 is arranged between the rear end of the main handle 11 and the motor 20. In this way, in the front-rear direction, the battery pack 30 is arranged closer to the motor 20, so that the center of gravity G of the whole machine is closer to the motor shaft 21 in the front-rear direction. In this example, in the front-rear direction, when the battery pack 30 is installed, the distance between the center of gravity G of the electric circular saw 100 and the center of the saw blade 51 is reduced, thereby, the torque arm of the electric circular saw 100 to be overturned during the working process can be reduced, and the torque of the electric circular saw 100 to be overturned can be reduced, the working stability of the electric circular saw 100 can be improved, and the user's work efficiency can be improved. The battery mounting portion 13 is formed with an enclosing receiving groove 131 with an opening that opens to the right, and the opening allows the battery pack 30 to be inserted into the receiving groove 131 from the right to the left. The receiving groove 131 embraces the battery pack 30 from the left side, upper side, lower side, front side, and rear side of the battery pack 30. On the one hand, the battery pack can be prevented from accidental detachment; on the other hand, the battery mounting portion 13 can also enhance the strength of the front and rear connection of the housing. In this way, the battery mounting portion 13 has a top surface and a bottom surface, the top surface connects the upper side of the casing portion of the motor 20 and the front end of the main handle 11, and the bottom surface is connected to the rear end of the main handle 11. Therefore, the battery mounting portion 13 can also enhance the strength of the housing while mounting the battery pack 30. In the present example, the battery mounting portion 13 is provided such that the main handle 11 is directly connected to the motor casing portion 14 though the battery mounting portion 13, thus, in the front-rear direction, there is also a certain gap between the main handle 11 and the battery mounting portion 13 and the rear side of the guard 80, so as to facilitate the heat dissipation of the motor 20, the gear box and other electronic components inside the housing 10, and the heat dissipation of the battery pack 30.

The battery pack 30 and the battery mounting portion 13 form a detachable sliding connection. Specifically, the battery mounting portion 13 is provided with a guide rail for the battery pack 30 to slide, and the battery pack 30 is provided with a sliding groove that engages with the guide rail. In another example, a sliding groove for sliding the battery pack 30 may be provided on the battery mounting portion 13, and a guide rail that engages with the sliding groove is provided on the battery pack 30. In summary, the main handle 11, the housing 10 and the battery mounting portion 13 are fixedly connected or integrally formed. Preferably, the main handle 11, the housing 10 and the battery mounting portion 13 are integrally formed. It can be understood that the guard 80 and the housing 10 are two parts. The helical gears are at least partially arranged in the gear box casing, the gear box and the guard 80 are fixedly connected or integrally formed, and the housing 10 is fixedly connected with the gear box casing. When the saw blade 51 rotates at a high speed to cut a workpiece, lots of heat will be generated. The guard 80 is made of metal to facilitate the heat dissipation of the saw blade 51. The housing 10 can be made of plastic.

The battery pack 30 is mounted to the battery mounting portion 13 along a first straight line 103, and the first straight line 103 is substantially parallel to the base plate plane 71. In the left-right direction, the projection of the battery pack 30 on the base plate plane 71 protrudes from the projection of the motor 20 on the base plate plane 71. In other words, when the battery pack 30 is installed on the electric circular saw 100, the maximum distance from the battery pack 30 to the first side surface 52 in the direction along the second rotation axis 102 is greater than the maximum distance from the motor 20 to the first side surface 52 in the direction along the second rotation axis 102. That is, the motor 20 in this application has a smaller size in the left-right direction compared to the battery pack 30, which shortens the projection length of the motor 20, and reduces the width of the whole machine, and makes the center of gravity of the whole machine closer to the saw blade 51, thereby reducing the torque. During cutting operation, the user does not need to apply a great force to prevent the electric circular saw 100 from overturning, which improves the user experience. When the battery pack 30 is mounted to the battery mounting portion 13 along the first straight line 103, the maximum distance L4 of the electric circular saw 100 in the direction along the second rotation axis 102 is greater than or equal to 162 mm. When the battery pack 30 is not mounted to the battery mounting portion 13, the maximum distance L5 of the electric circular saw 100 in the direction along the second rotation axis 102 is greater than or equal to 159 mm.

In this application, the electric circular saw 100 includes a plurality of battery packs 30, and the plurality of battery packs 30 are connected in series with each other. Specifically, the electric circular saw 100 may be provided with at least two battery packs 30 of the same capacity, which not only enhances the cutting speed of the electric circular saw 100, but also enhances the overload capacity of the circular saw 100. In the left-right direction, the battery pack 30 is provided on the right side of the cutting plane P, in particular, the circular saw 100 includes at least two battery pack 30, for the convenience of description, the battery pack 30 near the main handle 11 is defined as a first battery component, and the battery pack 30 near the motor 20 is defined as a second battery component. The projection of the main handle 11 in the up-down direction and the projection of the first battery component in the up-down direction at least partially overlap, and the first battery component is mounted to the battery mounting portion 13 along the first straight line 103, the second battery component is mounted to the battery mounting portion 13 along a second sliding direction, wherein the second sliding direction is parallel to the first straight line 103, the first straight line 103 intersects the first rotation axis 101, and the first straight line 103 has the same direction of the second sliding direction. The first battery component and the second battery component are both arranged on the right side of the cutting plane P, the first battery component and the second battery component are both arranged on the upper side of the base plate 70, namely the first battery component and the second battery component are arranged on the same side as motor 20.

In this application, in an example, the distance of the first battery component in the left-right direction is greater than the distance of the first battery component in the front-rear direction, and the arrangement of the second battery component is the same as the first battery component, that is, the first rotation axis has the same direction of the second sliding direction, and the first rotation axis is substantially perpendicular to the cutting plane. This arrangement reduces the size of the whole machine in the up-down direction, saves space and facilitates machining. In another example, the first rotation axis intersects the cutting plane, in other words, the battery pack is slidably mounted to the battery mounting portion in an obliquely downward manner. This arrangement facilitates the user to install and remove the battery pack. In some other examples, the first rotation axis is substantially parallel to the cutting plane, that is, the battery pack is slidably mounted to the battery mounting portion in a vertically downward manner, so that the center of gravity of the whole machine is close to the saw blade and the torque is reduced.

In other examples, the number of battery packs may also be one.

Figure 10:
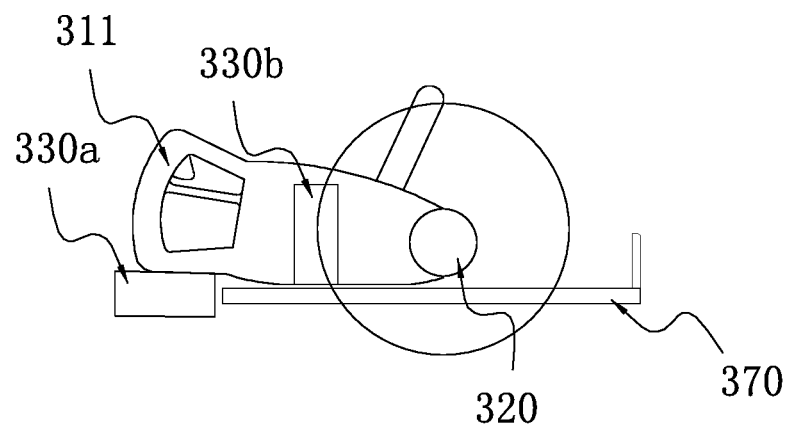
FIG. 10 is a schematic diagram of a mounting position of the battery pack according to a third example.

In other examples, the battery packs may also be arranged in the position shown in FIG. 10. In this example, the projections of the main handle 311 and the first battery component 330a on the plane of the base plate 370 at least partially overlap, that is, the first battery component 330a is disposed on the lower side of the main handle 311 and the rear side of the base plate 370. The projections of the motor 320 and the second battery component 330b on the plane of the second rotation axis at least partially overlap. The second battery component 330b is arranged between the main handle 311 and the motor 320, and on the upper side of the base plate 370. The first battery component 330a and the second battery component 330b are arranged separately. Specifically, the first battery component 330a is slidably connected to the battery mounting portion from the rear side to the front side, and the second battery component 330b is slidably connected to the battery mounting portion from the upper side to the lower side. With the above arrangement, two battery packs can avoid interference with the operation of the electric circular saw. Of course, the first battery component may also be slidably connected to the battery mounting portion from the right to the front.

Figure 11:
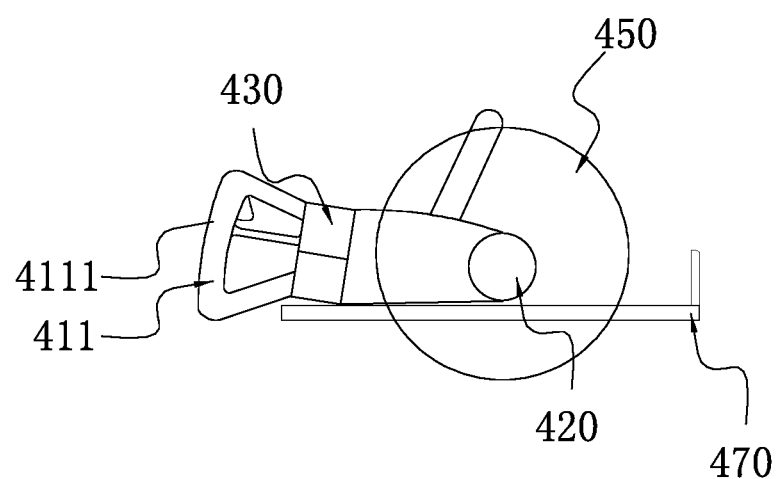
FIG. 11 is a schematic diagram of a mounting position of the battery pack according to a fourth example.

In other examples, the battery packs may also be arranged in the position shown in FIG. 11. In this example, two battery packs 430 are arranged adjacently, and the two battery packs 430 can be pushed along a direction perpendicular to the saw blade 450. When the two battery packs 430 are mounted to the position shown in FIG. 11, in the front-rear direction, the two battery packs 430 are arranged between the main handle 411 and the motor 420. When the two battery packs 430 are installed on the electric circular saw, the central line of the two battery packs 430 is basically parallel to the grip 4111 of the main handle 411. And the length of the two battery packs 430 in the left-right direction is within the length of the housing in the left-right direction.

Therefore, the two battery packs 430 can avoid interference with the operation of the electric circular saw.

Figure 9:
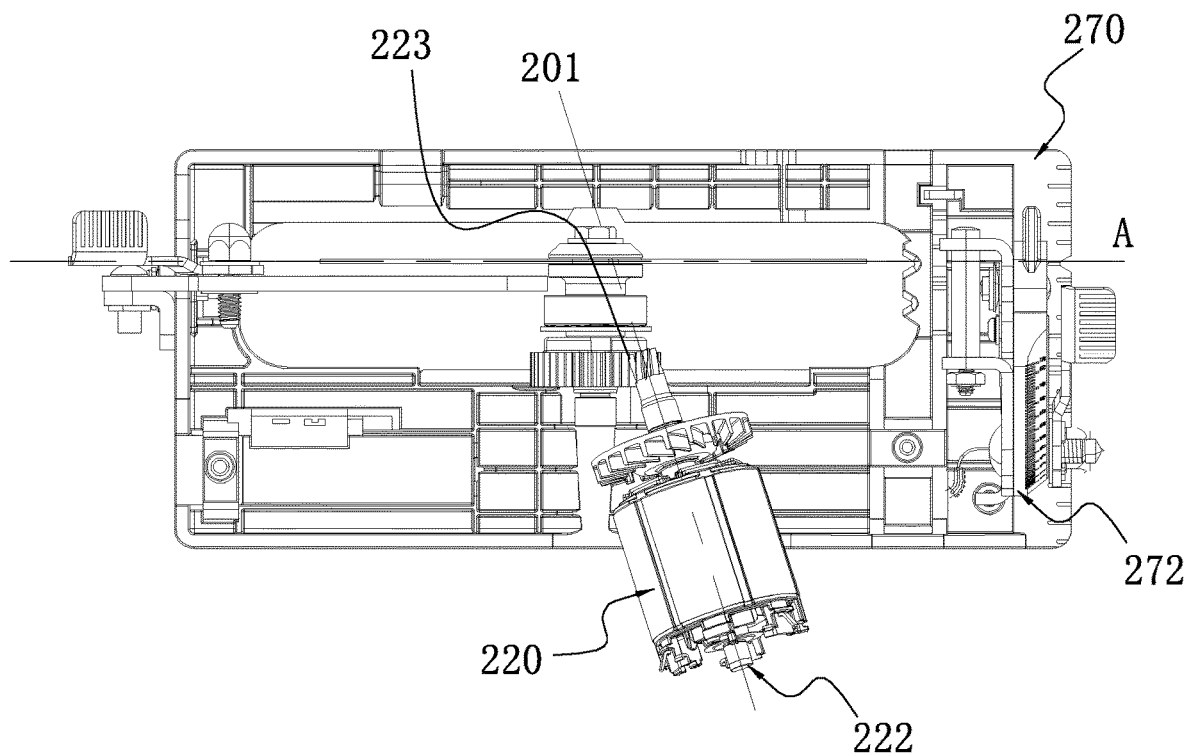
FIG. 9 is a top view of a part of the structure of the electric circular saw according to a second example.

Referring to the second example shown in FIG. 9, the saw blade, the base plate 270, the electric circular saw housing and the battery pack in the second example are basically the same as those in the first example. The difference lies in the way the motor 220 is arranged. The parts of the first example that are compatible with this example can all be applied to this example, and only the differences between this example and the first example will be described below. The second end 223 of the motor 220 is arranged in the first quadrant of the coordinate system, and the first end 222 of the motor 220 is arranged in the first quadrant of the coordinate system. The first rotation axis 201 obliquely intersects the first shaft, i.e., in the front-rear direction, the distance from the second end 223 of the motor 220 to the angle plate 272 is greater than the distance from the first end 222 of the motor 220 to the angle plate 272. In this example, the first rotation axis 201 obliquely intersects the cutting plane A, that is, the angle between the direction of the first rotation axis 201 and the cutting plane A is greater than or equal to 45 degrees and less than or equal to 80 degrees. Further, the angle between the direction of the first rotation axis 201 and the cutting plane A is greater than or equal to 55 degrees and less than or equal to 80 degrees. Further, the angle between the direction of the first rotation axis 201 and the cutting plane A is greater than or equal to 60 degrees and less than or equal to 80 degrees. Further, the angle between the direction of the first rotation axis 201 and the cutting plane A is greater than or equal to 65 degrees and less than or equal to 80 degrees. Further, the angle between the direction of the first rotation axis 201 and the cutting plane A is greater than or equal to 45 degrees and less than 78 degrees. Further, the angle between the direction of the first rotation axis 201 and the cutting plane A is greater than or equal to 55 degrees and less than 78 degrees. Further, the angle between the direction of the first rotation axis 201 and the cutting plane A is greater than or equal to 60 degrees and less than or equal to 78 degrees. Further, the angle between the direction of the first rotation axis 201 and the cutting plane A is greater than or equal to 65 degrees and less than or equal to 78 degrees. Through the above settings, not only the projection length of the motor 220 on the base plate plane is shortened, the width of the whole machine is reduced, and the distance between the center of gravity of the whole machine and the cutting plane A is shortened, but also the torque is reduced so that the user does not need to apply a great force to prevent the electric circular saw from overturning when operating the electric circular saw. At least more than half of the motor 220 is arranged in the first quadrant, so that there is more space left on the rear side of the electric circular saw for the battery pack and the circuit board, which facilitates the structural arrangement of the whole machine.

Figure 13:
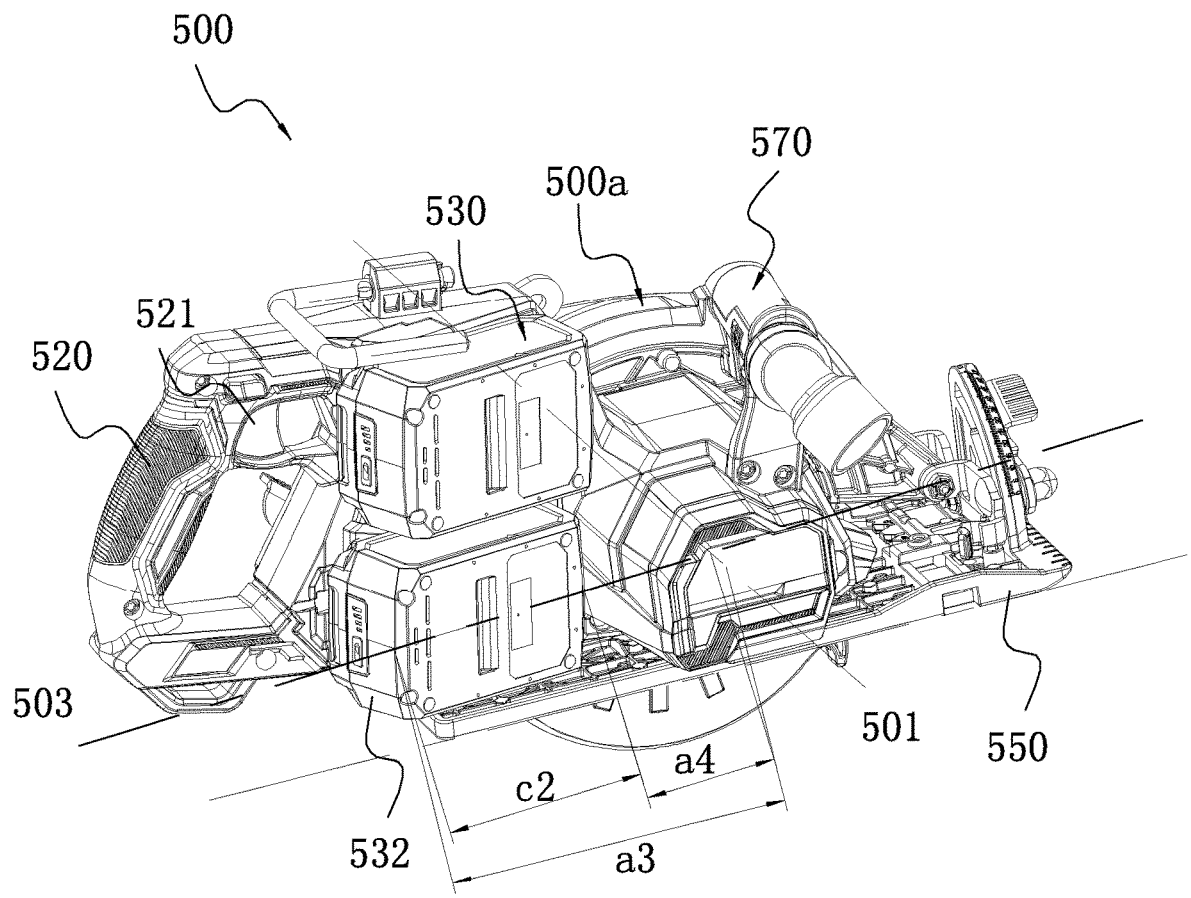
FIG. 13 is a perspective view of a mounting position of the battery pack according to a fifth example.
Figure 14:
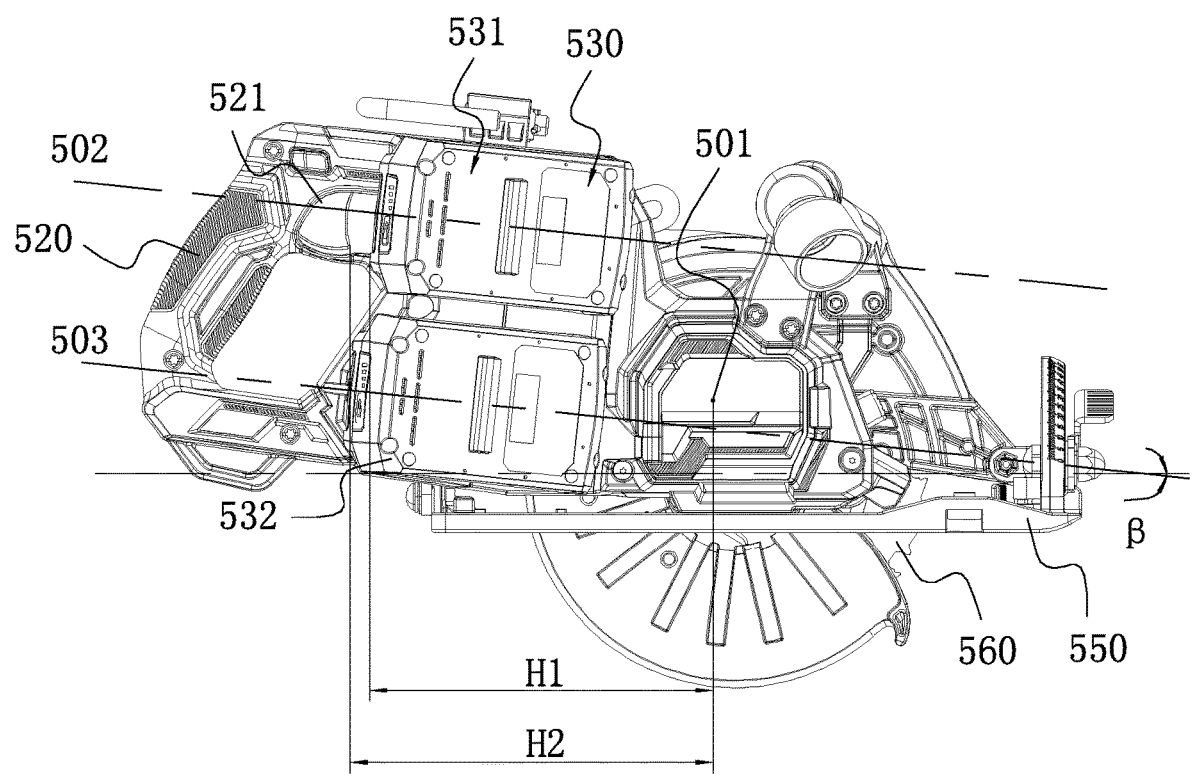
FIG. 14 is a plan view of the electric circular saw shown in FIG. 13.
Figure 15:
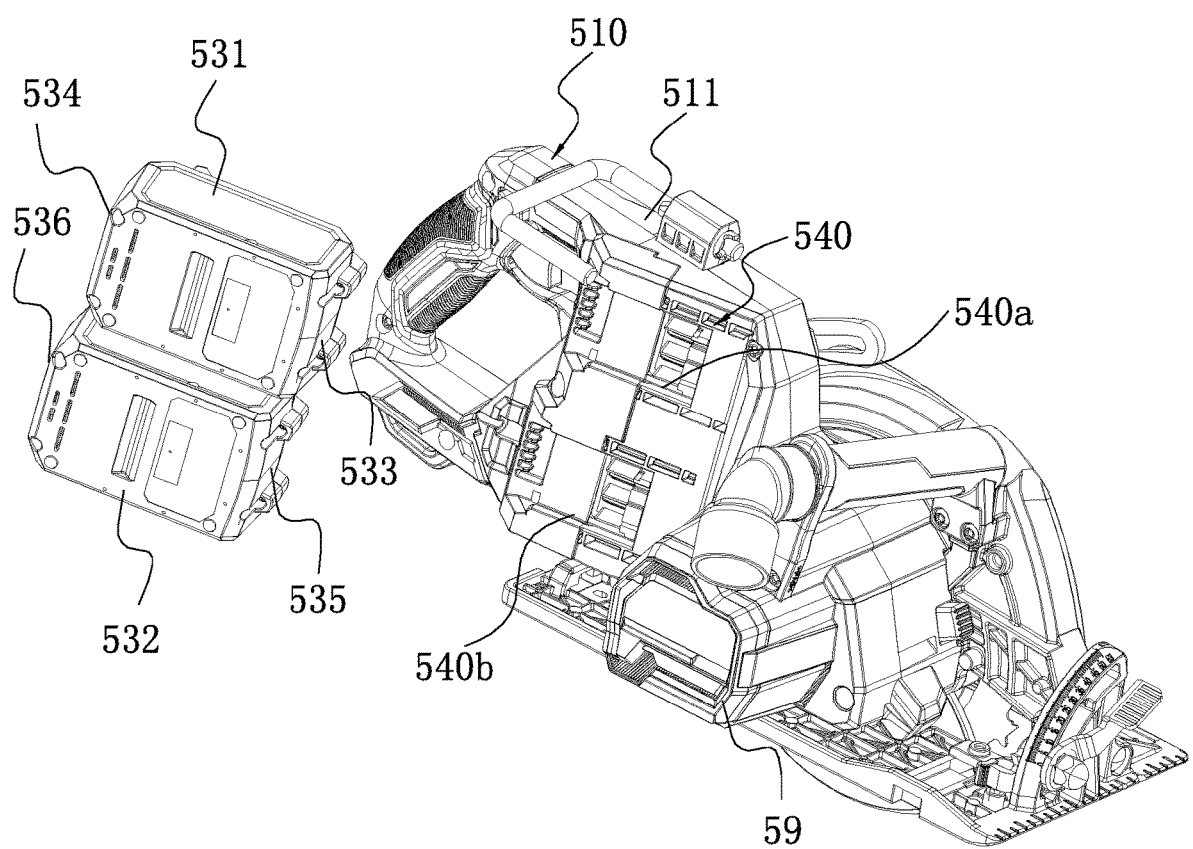
FIG. 15 is a schematic diagram of the circular saw shown in FIG. 13 with separated body and battery pack.
Figure 16:
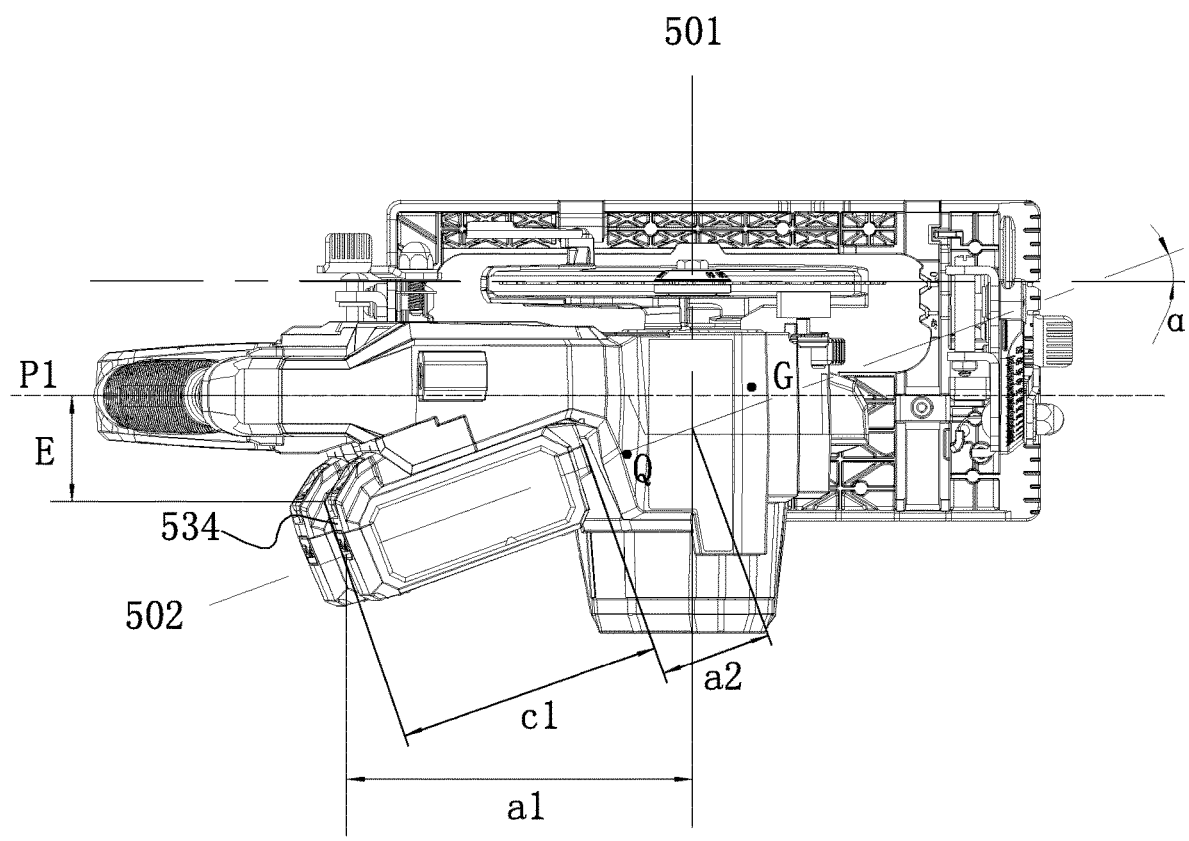
FIG. 16 is a top view of the electric circular saw shown in FIG. 13.

FIG. 13 shows a structural diagram of the electric circular saw with the battery pack mounted according to a fifth example. In this example, the saw blade, the motor, the base plate, etc. are basically the same as those in the first example, and the only difference lies in the way in which the battery pack is installed. The parts of the first example that are compatible with this example can all be applied to this example, and only the differences between this example and the first example will be described below. For ease of description, the up, down, front, rear, left, and right directions defined in the first example will continue to be used.

Referring to FIGS. 13-16, the electric circular saw 500 includes a body 500a and a battery pack assembly 530. The battery pack assembly 530 is installed on the battery mounting portion 540 so that the battery pack assembly 530 can provide energy to the motor. Specifically, the battery pack assembly 530 includes a first battery pack 531 connected to the housing along a first linear direction 502 and a second battery pack 532 connected to the housing 510 along a second linear direction 503. The first linear direction 502 is parallel to the second linear direction 503, and the first linear direction 502 obliquely intersects the second rotation axis 501 of rotation of the saw blade 560. The first battery pack 531 and the second battery pack 532 are both detachably connected to the housing 510, that is, when the battery pack is exhausted, the user can remove the battery pack and replace with another fully charged battery pack to make the electric circular saw 500 continue to work. In this example, the first battery pack 531 and the second battery pack 532 are basically the same, and the first battery pack 531 is disposed on the upper side of the second battery pack 532 in the up-down direction. It should be noted that the number of battery packs in the battery pack assembly 530 may also be two or more.

The first battery pack 531 has a first end 533 and a second end 534 that are oppositely arranged in the first linear direction 502. Similarly, the second battery pack 532 has a third end 535 and a fourth end 536 that are oppositely arranged in the second linear direction 503. In the left-right direction, the second end 534 is away from the saw blade 560 relative to the first end 533, and the fourth end 536 is away from the saw blade 560 relative to the third end 535. In the forward direction of the electric circular saw 500, the first distance a1 from the second end 534 of the first battery pack 531 to the second rotation axis 501 of the saw blade 560 is smaller than the sum of the second distance a2 from the first end 533 of the first battery pack 531 to the second rotation axis 501 in the first linear direction 502 and the length c1 of the first battery pack 531. Similarly, the third distance a3 from the fourth end 536 of the second battery pack 532 to the second rotation axis 501 is smaller than the sum of the third distance a3 from the third end 535 of the second battery pack 532 to the second rotation axis 501 in the second linear direction 503 and the length c2 of the second battery pack 532, that is, a1<a2+c1 and a3<a4+c2. That is, the first linear direction 502 and the second linear direction 503 both obliquely intersect with the forward direction of the electric circular saw 500, therefore, the first battery pack 531 and the second battery pack 532 are both slidably connected to the battery mounting portion 540 at an oblique angle. In this example, the output power of the electric circular saw 500 is greater than or equal to 1.4 kW. In order to ensure the normal operation of the electric circular saw 500 and its running time, the battery pack assembly 530 is required to have a higher voltage, thus, the weight of the corresponding battery pack assembly 530 is relatively large. Therefore, when the battery pack assembly 530 is installed on the body 500a, the center of gravity of the battery pack assembly 530 will affect the center of gravity G of the body 500a, shifting the center of gravity Q of the electric circular saw 500 to the right, which not only causes the torque to increase, but also makes the electric circular saw 500 easy to roll over when left standing. Through the above arrangement, the influence of the weight of the battery pack assembly 530 on the center of gravity Q of the electric circular saw 500 can be reduced. In other words, the center of gravity Q of the electric circular saw 500 is configured to be as close as possible to the center of gravity G of the body 500a, therefore, when the user installs the battery pack assembly 530, the distance between the center of gravity Q of the electric circular saw 500 and the saw blade 560 is not increased, and the user does not need to apply a large force to control the electric circular saw 500. In the above settings, the user can control the electric circular saw 500 with a relatively small force, which improves the user's experience and at the same time ensures the stable operation of the electric circular saw 500.

The first linear direction 502 and the second linear direction 503 are substantially parallel, that is, the first battery pack 531 and the second battery pack 532 are installed to the housing 510 substantially in the same direction. Wherein, in the forward direction of the electric circular saw 500, the ratio of the first distance a1 from the second end 534 of the first battery pack 531 to the second rotation axis 501 to the sum of the second distance a2 from the first end 533 of the first battery pack 531 to the second rotation axis 501 along the first linear direction 502 and the length c1 of the first battery pack 531 is greater than or equal to 0.7, that is, a1/(a2+c1)≥0.7. The installation directions of the second battery pack 532 and the first battery pack 531 are basically the same. Thus, the ratio of the third distance a3 from the fourth end 536 of the second battery pack 532 to the second rotation axis 501 to the sum of the fourth distance a4 from the third end 535 to the second rotation axis 501 along the second linear direction 503 and the length c2 of the second battery pack 532 is also greater than or equal to 0.7, that is, a3/(a4+c2)≥0.7. This setting can ensure the stable operation of the electric circular saw 500, make the size of the electric circular saw 500 in the left-right direction more reasonable, and avoid increasing the size of the electric circular saw 500 in the left-right direction. In this application, the forward direction of the electric circular saw 500 is defined to be substantially the same as the front-rear direction. Of course, the first linear direction and the second linear direction may not be parallel, that is, the first linear direction and the second linear direction intersect obliquely. In this example, preferably, the first linear direction is substantially parallel to the second linear direction.

Figure 17:
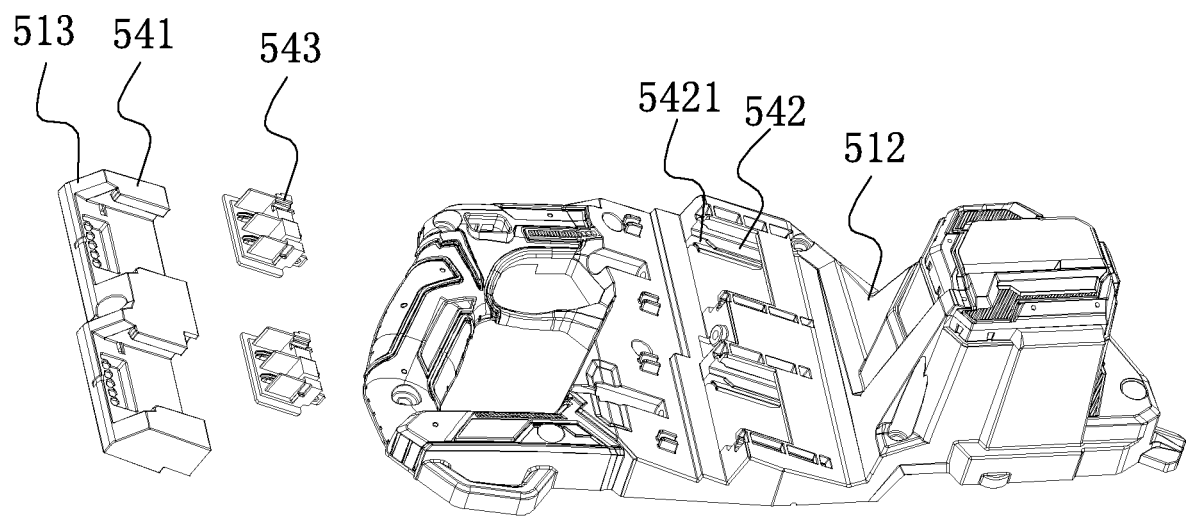
FIG. 17 is a schematic diagram of a part of the structure of the electric circular saw shown in FIG. 13.

Referring to FIG. 17, the housing 510 includes a first housing portion 511, a second housing portion 512 and a third housing portion 513. The first housing portion 511 and the second housing portion 512 form a motor casing portion 59 provided with an accommodating cavity for accommodating the motor. In the left-right direction, the first housing portion 511 is arranged on the left side, and the second housing portion 512 and the third housing portion 513 are arranged on the right side. The third housing portion 513 is fixedly connected to the second housing portion 512, and the third housing portion 513 can be separated from the second housing portion 512. The second housing portion 512 and the third housing portion 513 form a battery mounting portion 540, the battery mounting portion 540 is disposed between a main handle 520 and the motor casing portion 59, the battery mounting portion 540 comprises a first mounting portion 540a for guiding the first battery pack 531 to be coupled to the housing 510 in the first linear direction 502 and a second mounting portion 540b for guiding the second battery pack 532 to be coupled to the housing 510 in the second linear direction 503, the second mounting portion 540b is provided at a lower side of the first mounting portion 540a, and the battery mounting portion 540 is configured to detachably mount at least one battery pack to provide energy to the motor. Specifically, in the front-rear direction, the battery mounting portion 540 is arranged between the motor and the main handle 520, and in the left-right direction, the main handle 520 is basically symmetrically arranged about a plane P1, and the battery mounting portion 540 is arranged on the right side of the plane P1. The first linear direction 502 obliquely intersects the plane P1. It can also be understood that the battery mounting portion 540 is provided on the right side of the main handle 520. Arranging the battery mounting portion 540 between the motor and the main handle 520 can make full use of the space between the motor and the main handle 520, and the battery mounting portion 540 in the present application is basically open, so the user can use battery packs of different capacities according to needs.

In this example, the first battery pack 531 and the second battery pack 532 are arranged in parallel and side by side on the upper side of the base plate 550, that is, the first battery pack 531 and the second battery pack 532 are both slidably connected to the battery mounting portion 540 along the first linear direction 502, wherein the included angle between the first linear direction 502 and the forward direction of the electric circular saw 500 in a projection plane perpendicular to the up-down direction is α, and the range of the included angle α is greater than 0 degree and less than or equal to 30 degrees. By slidably connecting the battery pack assembly 530 to the battery mounting portion 540 in a forwardly inclined manner, the included angle α is configured to be within a reasonable range. The user can insert and remove the battery pack assembly 530 without being interfered by other parts, thus facilitating the user to insert and remove the battery pack assembly 530. Preferably, if the range of the included angle α is greater than 10 degrees and less than or equal to 25 degrees, the result is better. The included angle between the first linear direction 502 and the forward direction of the electric circular saw 500 in a projection plane perpendicular to the front-rear direction is β, and the range of the included angle β is greater than or equal to 0 degree and less than or equal to 10 degrees. That is, the battery pack assembly 530 is slidably connected to the battery mounting portion 540 in a downwardly inclined manner, that is, the end of the battery pack is slightly tilted to facilitate the user to insert and remove the battery pack assembly 530.

Further, the ratio of the first distance a1 from the second end 534 of the first battery pack 531 to the second rotation axis 501 in the forward direction of the electric circular saw 500 to the sum of the second distance a2 from first end 533 of the first battery pack 531 to the second rotation axis 501 along the first linear direction 502 and the length C of the first battery pack 531 is greater than or equal to 0.8 and less than or equal to 1.2. That is, the first battery pack 531 will be slidably mounted on the housing 510 in an inclined manner. This arrangement can prevent the first battery pack 531 from being too long in the front-to-rear direction or the left-to-right direction, thereby avoiding electric circular saw 500 to be too long in the front-to-rear direction or the left-to-right direction. At the same time, the space between the motor and the main handle 520 can be reasonably used, so that the overall machine structure arrangement is more reasonable. Preferably, if the ratio of the first distance a1 to the sum of the second distance a2 and the length C of the battery pack is greater than or equal to 0.9 and less than or equal to 1.1, the result is better.

The battery mounting portion 540 includes a guiding portion 541, a positioning portion 542 and a connecting portion 543. The guiding portion 541 is used to guide the battery pack assembly 530 to slide along the first linear direction 502, the connecting portion 543 is used to connect with the battery pack assembly 530 to supply electric energy, and the positioning portion 542 battery mounting portion 540 are used to locate and fix the connecting portion 543. In this example, the connecting portion 543 is a connecting base, and the battery pack assembly 530 is connected with the connecting base to realize the energy transmission from the battery pack assembly 530 to the motor. The connecting portion 543 is fixedly connected to the guiding portion 541 through the positioning portion 542 to achieve positioning. Specifically, the positioning portion 542 is provided with a positioning groove 5421, and the connecting base slides into the positioning groove 5421 in a direction substantially parallel to the first linear direction 502. After the connecting base is slid in place, the guiding portion 541 is fixedly installed so that the guiding portion 541, the positioning portion 542 and the connecting portion 543 remain in a relatively fixed state. The positioning portion 542 is formed by the second housing portion 512, and the guiding portion 541 is formed by the third housing portion 513. The third housing portion 513 is fixedly connected to the second housing portion 512 by means of screws. This arrangement enables the battery pack assembly 530 to be slidably connected to the connecting portion 543 through the guiding portion 541. Moreover, the battery mounting portion 540 is made of a separate housing, which is easy to process and easy to realize.

The electric circular saw 500 further includes a switch assembly 521 installed on the main handle 520, and the switch assembly 521 is operated by the user to control the operation of the electric circular saw 500. In this example, the ratio of the distance H1 from the second end 534 of the first battery pack 531 to the second rotation axis 501 in the forward direction of the electric circular saw 500 to the distance H2 from the switch assembly 521 to the second rotation axis 501 in the forward direction of the electric circular saw 500 is greater than or equal to 0.8 and less than or equal to 1.1. That is, the switch assembly 521 is arranged on the rear side of the first battery pack 531, and there is enough space for the user to operate the switch assembly 521 between the switch assembly 521 and the first battery pack 531. With this configuration, when the electric circular saw 500 is working, the first battery pack 531 is prevented from affecting the user operating the switch assembly 521.

In the direction along the second rotation axis 501, the distance E from the second end 534 of the first battery pack 531 to the plane P1 is greater than 45 mm. Thus, there is enough space from the second end of the battery pack assembly 530 to the main handle 520 in the left-right direction for the user to operate the switch assembly 521.

Figure 18:
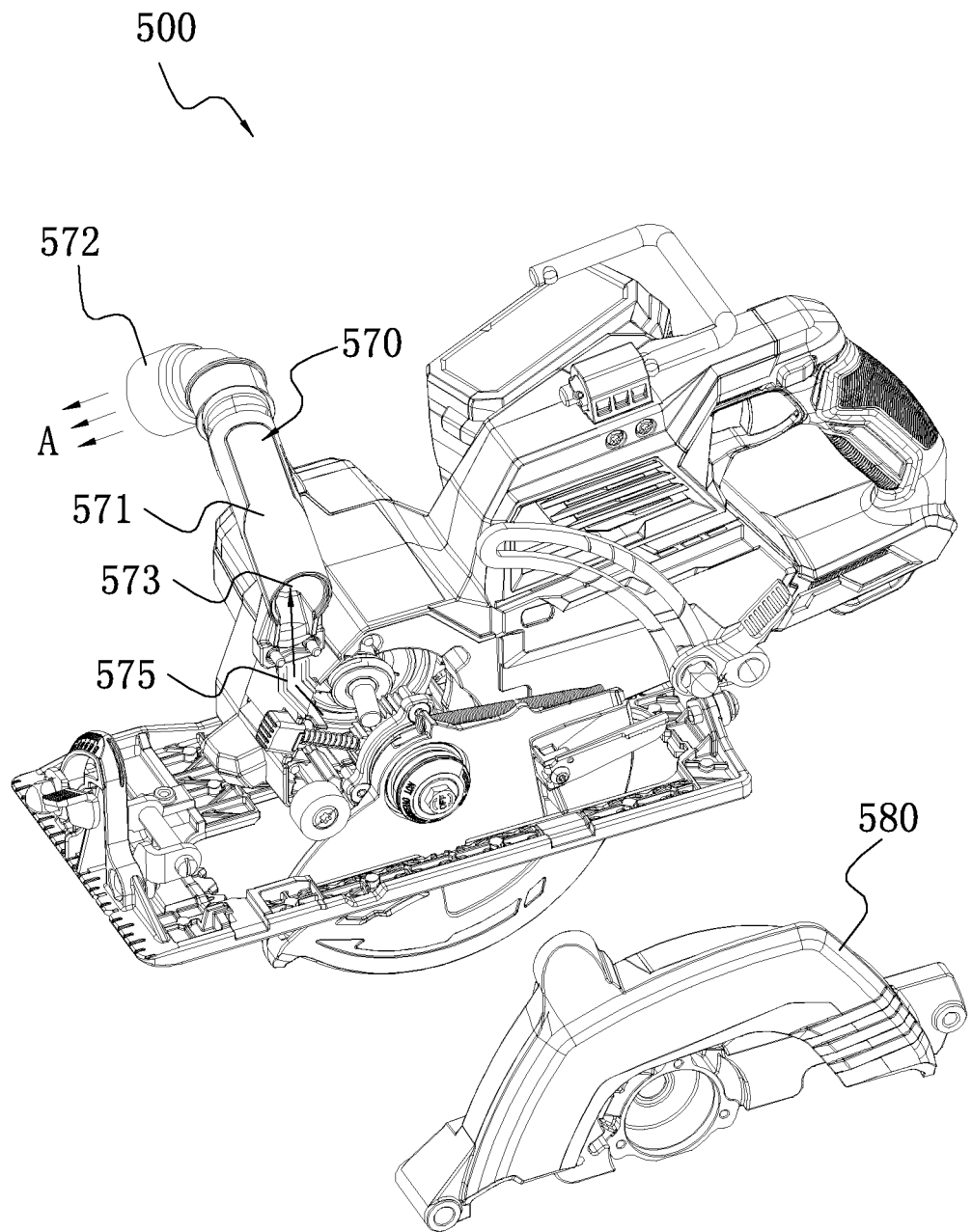
FIG. 18 is a schematic diagram of the electric circular saw shown in FIG. 13 with a part of the structure separated.
Figure 19:
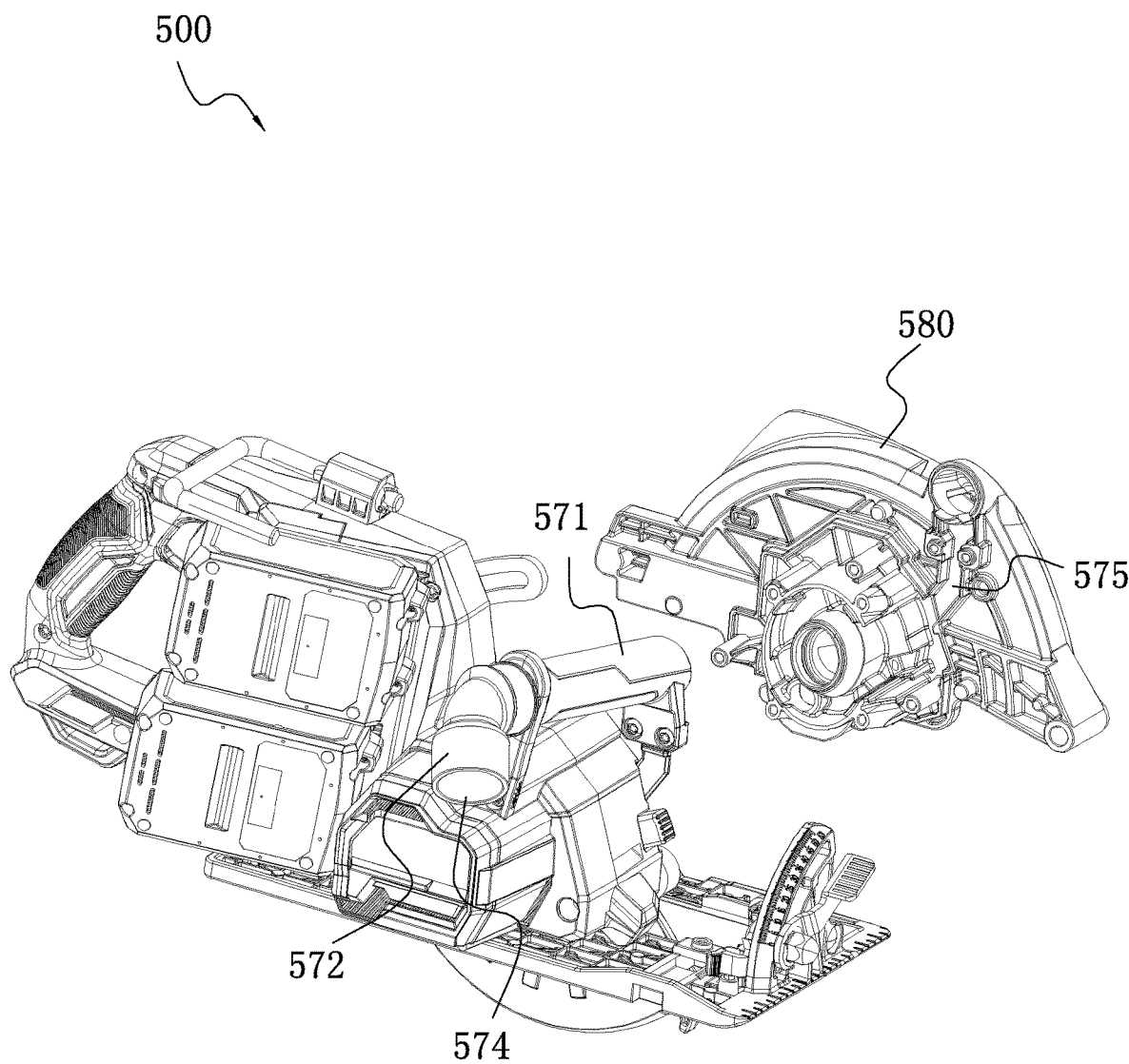
FIG. 19 is a schematic diagram of the electric circular saw shown in FIG. 18 from another perspective.

Referring to FIGS. 18-19, the electric circular saw 500 further includes a guard 580 and a discharge assembly 570. The guard 580 is used to partially enclose the saw blade 560 in the circumferential direction about the first rotation axis to protect the safety of the user. The discharge assembly 570 is used to discharge airflow A with sawdust when the electric circular saw is cutting. Specifically, the discharge assembly 570 includes an auxiliary handle 571 to be held by a user, an exhaust member 572 for discharging the airflow A with sawdust, and a guide portion 575 for guiding the flow of the airflow A. The auxiliary handle 571 is arranged on the upper side of the motor, one end of the auxiliary handle 571 is fixed on the guard 580, and the other end is fixedly connected to the housing 510. In the direction extending along the auxiliary handle 571, a central channel 573 for airflow A is formed in the center of the auxiliary handle 571. One end of the central channel 573 is connected with the accommodating cavity of the housing 510, and the other end of the central channel 573 is connected with the exhaust member 572, and finally the airflow A with sawdust is exhausted from a vent 574 on the exhaust member 572. The exhaust member 572 is rotatably connected to the auxiliary handle 571. This arrangement facilitates the user to adjust the direction of the vent 574, so that the airflow A discharged by the exhaust member 572 is away from the user. The guide portion 575 is formed by the guard 580 and the auxiliary handle 571 to guide the airflow A to the central channel 573 in the flow direction as shown in FIG. 17. Specifically, the auxiliary handle 571 on the side close to the guard 580 and the left side of the guard 580 cooperate to form a guide portion 575 for guiding the airflow A, and the guide portion 575 is connected with the accommodating cavity. The basic principles, main features and advantages of the subject disclosure have been shown and described above.

Those skilled in the industry should understand that the foregoing examples do not limit the claimed invention in any form, and all technical solutions obtained by equivalent substitutions or equivalent transformations fall within the protection scope of the claimed invention.

What is claimed is:

1. An electric circular saw, comprising:
    a housing comprising a main handle and an auxiliary handle forward of the main handle;
    a motor comprising a motor shaft enabled to rotate about a first rotation axis, the motor at least partially disposed in the housing; and
    a transmission assembly comprising a first transmission member connected with the motor for introducing power into the transmission assembly and a second transmission member for outputting power, the second transmission member enabled to rotate about a second rotation axis;
    wherein the motor shaft has a first end and a second end located where the first rotation axis of the motor shaft passes through the second end of the motor shaft and distally located from the first end along the motor shaft, the first transmission member is mounted to the second end of the motor shaft, and when viewed from a vertical plane perpendicular to the second rotation axis, the second end of the motor shaft is arranged in a first quadrant of a coordinate system oriented when the auxiliary handle is above the motor and the main handle is at a rear of the housing and having an origin defined by a point on the second rotation axis, a positive direction of an X axis defined by a forward direction of the electric circular saw, and a positive direction of a Y axis defined by an upper side of the electric circular saw,
    wherein the electric circular saw also comprises a saw blade having a cutting plane and the cutting plane and the first rotation axis intersect obliquely, and
    wherein the cutting plane is an extended plane of the saw blade when the saw blade is mounted to the electric circular saw, a projection of a line connecting the first end of the motor shaft and the second rotation axis on the cutting plane is a first projection line, and an included angle b formed by an oblique intersection of the first projection line and the Y axis is greater than 0 degree and less than or equal to 30 degrees.

2. The electric circular saw of claim 1, wherein the first transmission member is arranged in the first quadrant of the coordinate system.

3. The electric circular saw of claim 1, wherein the first end of the motor shaft is arranged in a second quadrant of the coordinate system.

4. The electric circular saw of claim 1, wherein the first end of the motor shaft is arranged on an upper side of the second end.

5. The electric circular saw of claim 1, wherein a projection of a line connecting the second end of the motor shaft and the second rotation axis on the cutting plane is a second projection line and an included angle c formed by an oblique intersection of the second projection line and the Y axis is greater than 0 degree and less than or equal to 60 degrees.

6. The electric circular saw of claim 1, wherein a projection of a line connecting the second end of the motor shaft and the second rotation axis on the cutting plane is a second projection line and an included angle d formed by an intersection of the second projection line and the first projection line is greater than 0 degree and less than or equal to 90 degrees.

7. The electric circular saw of claim 1, wherein the housing further comprises the main handle, a switch assembly mounted to the main handle, a motor casing portion enclosing the motor, and a battery mounting portion configured to detachably mount a battery pack and configured to connect the motor casing portion and the main handle.

8. The electric circular saw of claim 1, wherein a distance between the first end of the motor shaft and the saw blade in a direction parallel to the second rotation axis is less than a sum of a distance between the second end of the motor shaft and the saw blade in a direction parallel to the first rotation axis and a length of the motor shaft.

9. The electric circular saw of claim 8, wherein a ratio of the distance between the first end of the motor shaft and the saw blade the direction parallel to the second rotation axis to the sum of the distance between the second end of the motor shaft and the saw blade in the direction parallel to the first rotation axis and the length of the motor shaft is greater than or equal to 0.8.

10. The electric circular saw of claim 8, wherein the distance between the first end of the motor shaft and the saw blade is greater than or equal to 105 mm and less than or equal to 160 mm.

11. The electric circular saw of claim 1, wherein the electric circular saw further comprises a battery pack mounted to the housing for supplying electric energy to the motor, the first transmission member is enabled to rotate synchronously with the motor, the second transmission member is enabled to be driven by the first transmission member to rotate about the second rotation axis, the second rotation axis substantially extends along a left-right direction, the first rotation axis intersects the left-right direction, the second end is located on a lower side of the first end in an up-down direction, and the up-down direction is substantially perpendicular to the left-right direction.

12. The electric circular saw of claim 11, wherein the saw blade is driven by the motor to rotate about the second rotation axis, the saw blade has a first side surface, the first side surface is parallel to the cutting plane, the motor has a first end surface, the first end surface is located on a side away from the saw blade in the left-right direction, a distance between the first end surface and the first side surface along a first direction parallel to the first rotation axis is a first length L1, a distance between the first end surface and the first side surface along a second direction parallel to the second rotation axis is a second length L2, and a ratio of the first length L1 to the second length L2 ranges from 1.02 to 1.1.

13. The electric circular saw of claim 12, wherein a ratio of a rotational speed of the first transmission member driven by the motor to a rotational speed of the second transmission member driven by the first transmission member is a reduction ratio and the reduction ratio is greater than or equal to 4 and less than or equal to 6.5.

14. The electric circular saw of claim 11, wherein the first transmission member is fixedly connected or integrally formed with the motor shaft, the first transmission member engages with the second transmission member.

15. The electric circular saw of claim 1, wherein the electric circular saw comprises at least two battery packs.

16. The electric circular saw of claim 1, wherein the housing comprises the main handle, a motor casing portion for accommodating the motor, and a battery mounting portion provided between the main handle and the motor casing portion, the battery mounting portion comprises a first mounting portion for guiding a first battery pack to be coupled to the housing in a first linear direction and a second mounting portion for guiding a second battery pack to be coupled to the housing in a second linear direction, and the second mounting portion is provided at a lower side of the first mounting portion.

17. The electric circular saw of claim 16, wherein the first linear direction is parallel to the second linear direction, the first linear direction obliquely intersects the first rotation axis, and the main handle is symmetrically arranged about a plane and the first linear direction obliquely intersects the plane.

18. An electric circular saw, comprising:
a housing comprising a main handle and an auxiliary handle forward of the main handle;
a motor comprising a motor shaft enabled to rotate about a first rotation axis, the motor at least partially disposed in the housing; and
a transmission assembly comprising a first transmission member connected with the motor for introducing power into the transmission assembly and a second transmission member for outputting power, the second transmission member enabled to rotate about a second rotation axis;
wherein the motor shaft has a first end and a second end distally located from the first end along the motor shaft, the first transmission member is mounted to the second end of the motor shaft, and in a coordinate system oriented when the auxiliary handle is above the motor and the main handle is at a rear of the housing and having an origin defined by a point on the second rotation axis, a positive direction of an X axis defined by a forward direction of the electric circular saw, and a positive direction of a Y axis defined by an upper side of the electric circular saw, the first rotation axis obliquely intersects with the positive direction of the Y axis to form an angle a and the angle a is greater than 0 degrees and less than 90 degrees, and
wherein the electric circular saw has a cutting plane, the cutting plane is an extended plane of a saw blade when the saw blade is mounted to the electric circular saw, a projection of a line connecting the first end of the motor shaft and the second rotation axis on the cutting plane is a first projection line, and an included angle b formed by an oblique intersection of the first projection line and the Y axis is greater than 0 degree and less than or equal to 30 degrees.

19. The electric circular saw of claim 18, wherein the second end of the motor shaft is arranged in a first quadrant of the coordinate system.

20. An electric circular saw, comprising:
a housing comprising a main handle and an auxiliary handle forward of the main handle;
a motor comprising a motor shaft enabled to rotate about a first rotation axis, the motor at least partially disposed in the housing; and a transmission assembly comprising a first transmission member connected with the motor for introducing power into the transmission assembly and a second transmission member for outputting power, the second transmission member enabled to rotate about a second rotation axis;

wherein the motor shaft has a first end and a second end oppositely arranged in a longitudinal direction, the first transmission member is mounted to the second end of the motor shaft, and the second end of the motor shaft is arranged in a first quadrant of a coordinate system oriented when the auxiliary handle is above the motor and the main handle is at a rear of the housing and having an origin defined by a point on a center line of the second transmission member, a positive direction of an X axis defined by a forward direction of the electric circular saw, and a positive direction of a Y axis defined by an upper side of the electric circular saw, and wherein the electric circular saw also comprises a saw blade for cutting a workpiece, and a distance between the first end of the motor shaft and the saw blade is less than a sum of a distance between the second end of the motor shaft and the saw blade along the first rotation axis and a length of the motor shaft, and wherein the electric circular saw has a cutting plane, the cutting plane is an extended plane of a saw blade when the saw blade is mounted to the electric circular saw, a projection of a line connecting the first end of the motor shaft and the second rotation axis on the cutting plane is a first projection line, and an included angle b formed by an oblique intersection of the first projection line and the Y axis is greater than 0 degree and less than or equal to 30 degrees.

* * * * *